US012700259B2

(12) United States Patent
Venkata Jagannadha Rao

(10) Patent No.: US 12,700,259 B2
(45) Date of Patent: Aug. 4, 2026

(54) SYSTEM AND METHOD FOR MONITORING, IDENTIFYING LOCATION AND DIRECTION OF IMPACT EVENTS IN REAL-TIME

(71) Applicant: Anirudha Surabhi Venkata Jagannadha Rao, Dallas, TX (US)

(72) Inventor: Anirudha Surabhi Venkata Jagannadha Rao, Dallas, TX (US)

(73) Assignee: QUINTESSENTIAL DESIGN INC., Dallas, TX (US)

( * ) Notice: Subject to any disclaimer, the term of this patent is extended or adjusted under 35 U.S.C. 154(b) by 401 days.

(21) Appl. No.: 18/136,397

(22) Filed: Apr. 19, 2023

(65) Prior Publication Data

US 2023/0343141 A1 Oct. 26, 2023

Related U.S. Application Data

(60) Provisional application No. 63/332,734, filed on Apr. 20, 2022.

(51) Int. Cl.
*G06V 40/20* (2022.01)
*G06V 20/40* (2022.01)

(52) U.S. Cl.
CPC .............. *G06V 40/23* (2022.01); *G06V 20/44* (2022.01); *G06V 2201/07* (2022.01)

(58) Field of Classification Search
CPC ..... G06V 40/23; G06V 20/44; G06V 2201/07
(Continued)

(56) References Cited

U.S. PATENT DOCUMENTS 8,161,570 B2 4/2012 McVeigh et al.
8,452,273 B1 5/2013 Khomenko
(Continued)

FOREIGN PATENT DOCUMENTS

CA 2641694 A1 8/2007
CN 108577005 9/2018
(Continued)

OTHER PUBLICATIONS

International Search Report and Written Opinion dated Jul. 31, 2023 from corresponding International Patent Application No. PCT/IB2023/054006, 9 pages.
(Continued)

*Primary Examiner* — Kerri L McNally
(74) *Attorney, Agent, or Firm* — Ruggiero McAllister & McMahon LLC

(57) ABSTRACT

A system for identifying location and direction of impact events in real-time comprises an impact event monitoring device includes multiple sensors, a processing device, and a memory unit. The sensors and the memory unit are electrically coupled to the processing device. The sensors configured to measure impact parameters, the impact parameters include quaternions, Euler angles, vital statistics, rotational angle of the head of the individual and the object, motion of the individual and the object, gyroscope vectors, and velocity. The measured impact parameters are transmitted to the processing device and is configured to analyze measured impact parameters and create impact data of impact events, second computing device includes an impact event reporting module. The impact event reporting module configured to receive the impact data of the impact events from the processing device thereby enabling an emergency service provider to determine severity of impact events to provide better treatment to the individual.

19 Claims, 13 Drawing Sheets

(58) Field of Classification Search
USPC ........................................................ 340/436
See application file for complete search history.

(56) References Cited

U.S. PATENT DOCUMENTS

| | | | |
|---|---|---|---|
| 8,556,831 B1 | 10/2013 | Faber et al. | |
| 8,559,914 B2 | 10/2013 | Jones | |
| 8,682,363 B1 | 3/2014 | Cardi | |
| 8,737,951 B2 | 5/2014 | Jones | |
| 9,049,558 B2 | 6/2015 | Jones | |
| 9,247,779 B1 | 2/2016 | Aloumanis et al. | |
| 9,444,892 B1 | 9/2016 | Amireddy | |
| 9,445,639 B1 | 9/2016 | Aloumanis | |
| 10,373,257 B1 | 8/2019 | Iqbal | |
| 10,997,430 B1 | 5/2021 | Slavin | |
| 2003/0071766 A1 | 4/2003 | Hartwell et al. | |
| 2010/0168958 A1 | 7/2010 | Baino | |
| 2011/0106375 A1 | 5/2011 | Gurusamy Sundaram | |
| 2012/0028624 A1 | 2/2012 | Jedlicka | |
| 2012/0067122 A1 | 3/2012 | Sakamoto | |
| 2012/0143526 A1* | 6/2012 | Benzel ................. | A61B 5/1121 |
| | | | 702/41 |
| 2012/0220893 A1* | 8/2012 | Benzel ................. | A61B 5/6844 |
| | | | 600/553 |
| 2012/0290146 A1 | 11/2012 | Dedes | |
| 2013/0150684 A1 | 6/2013 | Cooner | |
| 2013/0166198 A1 | 6/2013 | Funk | |
| 2013/0226369 A1 | 8/2013 | Yorio | |
| 2013/0290199 A1 | 10/2013 | Camacho | |
| 2014/0039355 A1* | 2/2014 | Crisco, III ............... | A61B 5/11 |
| | | | 600/595 |
| 2014/0273863 A1 | 9/2014 | Luizzi | |
| 2014/0305204 A1 | 10/2014 | Hong | |
| 2015/0040685 A1 | 2/2015 | Nicholson | |
| 2015/0194035 A1 | 7/2015 | Akiva | |
| 2015/0245680 A1* | 9/2015 | Partlo ................. | A42B 3/0473 |
| | | | 2/411 |
| 2015/0307048 A1 | 10/2015 | Santora | |
| 2015/0351690 A1 | 12/2015 | Toth et al. | |
| 2016/0017864 A1 | 1/2016 | Grabau et al. | |
| 2016/0044276 A1 | 2/2016 | Shearman et al. | |
| 2016/0066847 A1 | 3/2016 | Sales | |
| 2016/0075338 A1 | 3/2016 | Henn | |
| 2016/0171864 A1 | 6/2016 | Ciaramelletti | |
| 2016/0185291 A1 | 6/2016 | Chamberlin | |
| 2016/0262694 A1 | 9/2016 | Calcano et al. | |
| 2016/0278633 A1 | 9/2016 | Kozloski et al. | |
| 2016/0278686 A1 | 9/2016 | Kozloski et al. | |
| 2016/0331316 A1 | 11/2016 | Allen et al. | |
| 2016/0335814 A1 | 11/2016 | Tamari | |
| 2017/0053461 A1 | 2/2017 | Pal | |
| 2017/0088165 A1 | 3/2017 | Raphael | |
| 2017/0089699 A1 | 3/2017 | Azuma | |
| 2017/0105677 A1 | 4/2017 | Lerner | |
| 2017/0245129 A1 | 8/2017 | Johnson | |
| 2017/0296129 A1 | 10/2017 | Petterson | |

| | | | |
|---|---|---|---|
| 2018/0000184 A1 | 1/2018 | Jang et al. | |
| 2018/0007277 A1 | 1/2018 | Aibara | |
| 2018/0014597 A1 | 1/2018 | Cooke | |
| 2018/0014771 A1 | 1/2018 | Merchant-Borna et al. | |
| 2018/0028091 A1 | 2/2018 | Huang | |
| 2018/0070864 A1 | 3/2018 | Schuster | |
| 2018/0101998 A1 | 4/2018 | Pierce | |
| 2018/0270368 A1 | 9/2018 | Anwar | |
| 2019/0098953 A1 | 4/2019 | Strickland | |
| 2019/0142097 A1 | 5/2019 | Moor | |
| 2019/0147233 A1 | 5/2019 | Cherveny et al. | |
| 2019/0213429 A1 | 7/2019 | Sicconi | |
| 2019/0271543 A1 | 9/2019 | Serita | |
| 2019/0299822 A1 | 10/2019 | Garrido | |
| 2019/0354838 A1 | 11/2019 | Zhang | |
| 2019/0357834 A1 | 11/2019 | Aarts | |
| 2020/0100692 A1 | 4/2020 | Cotton | |
| 2020/0128902 A1 | 4/2020 | Brown et al. | |
| 2020/0312461 A1* | 10/2020 | Bartsch ............... | G01P 15/0891 |
| 2020/0367789 A1 | 11/2020 | Moffat et al. | |
| 2021/0030097 A1* | 2/2021 | Morgan ............... | A61B 5/6803 |
| 2021/0097370 A1 | 4/2021 | Agnihotram | |
| 2021/0219257 A1 | 7/2021 | Anand | |
| 2021/0290181 A1 | 9/2021 | Venkata Jagannadha Rao | |
| 2021/0293969 A1 | 9/2021 | Venkata Jagannadha Rao | |
| 2022/0164026 A1 | 5/2022 | Sicconi | |
| 2022/0301594 A1 | 9/2022 | Bose | |
| 2023/0065000 A1 | 3/2023 | Jagannadha Rao | |
| 2023/0065399 A1 | 3/2023 | Ren | |
| 2023/0347903 A1 | 11/2023 | Katz | |
| 2024/0199161 A1 | 6/2024 | Pfau | |

FOREIGN PATENT DOCUMENTS

| | | |
|---|---|---|
| CN | 207923404 U | 9/2018 |
| CN | 110236560 A | 9/2019 |
| DE | 202015009037 | 7/2016 |
| DE | 102015220697 | 4/2017 |
| JP | 2007249478 | 9/2007 |
| KR | 101828695 | 2/2018 |
| KR | 20190095199 A | 8/2019 |
| KR | 20210034458 A | 3/2021 |
| WO | 2016086230 | 6/2016 |
| WO | 2015143153 | 10/2016 |
| WO | 2018137375 | 8/2018 |
| WO | 2018167625 | 9/2018 |
| WO | 2020259858 A1 | 12/2020 |

OTHER PUBLICATIONS

International Preliminary Report on Patentability dated Oct. 31, 2024 from corresponding International Patent Application No. PCT/IB2023/054006, 8 pages.
"Deep Learning." Merriam-Webster.com Dictionary, Merriam-Webster, https://www.merriam-webster.com/dictionary/deep%20learning. Accessed Oct. 8, 2025. (Year: 2025).

* cited by examiner

600A

600B

600C

600D

600E

600F

600G

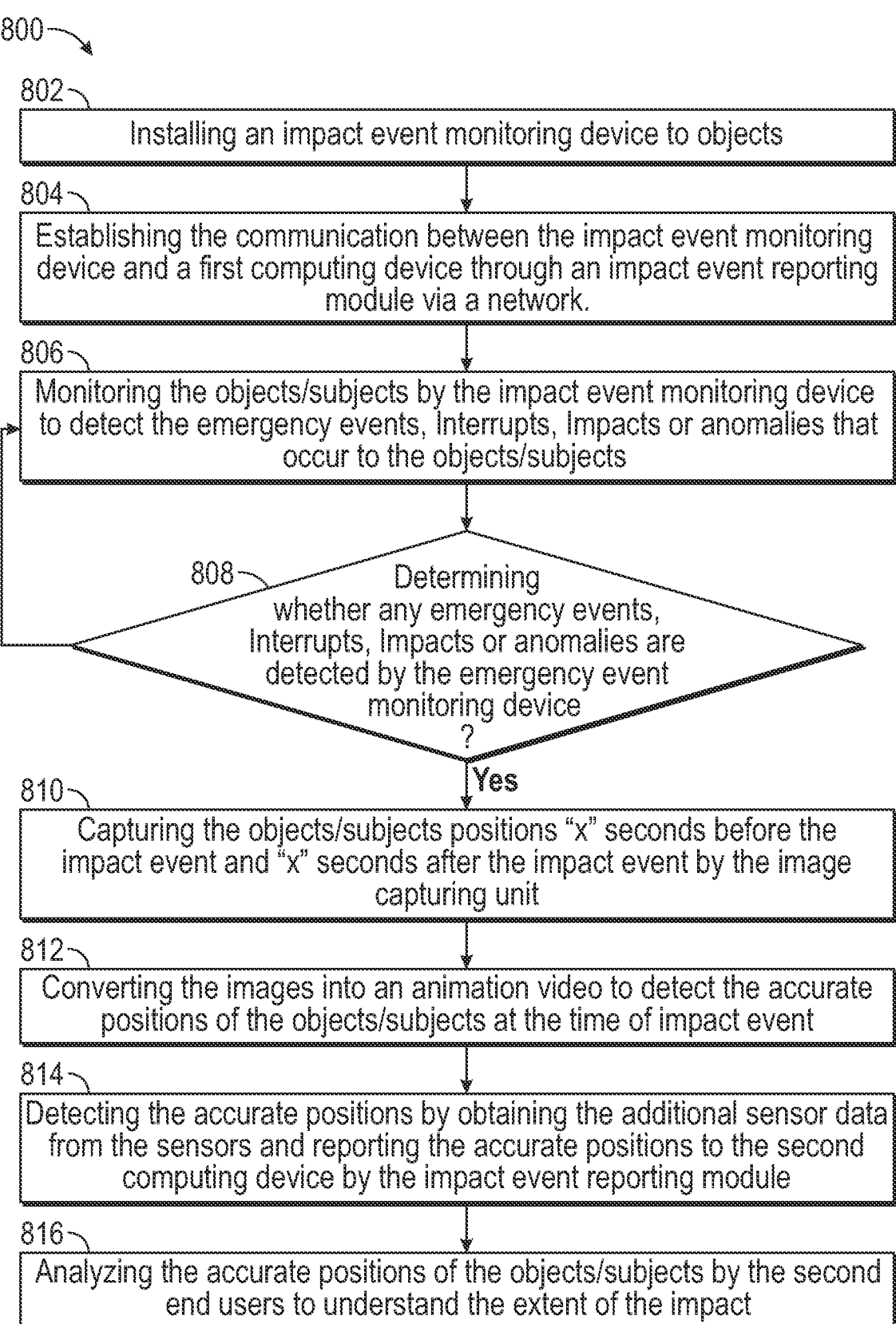

800

802
Installing an impact event monitoring device to objects

804
Establishing the communication between the impact event monitoring device and a first computing device through an impact event reporting module via a network.

806
Monitoring the objects/subjects by the impact event monitoring device to detect the emergency events, Interrupts, Impacts or anomalies that occur to the objects/subjects 808
Determining whether any emergency events, Interrupts, Impacts or anomalies are detected by the emergency event monitoring device
?

Yes

810
Capturing the objects/subjects positions "x" seconds before the impact event and "x" seconds after the impact event by the image capturing unit 812
Converting the images into an animation video to detect the accurate positions of the objects/subjects at the time of impact event 814
Detecting the accurate positions by obtaining the additional sensor data from the sensors and reporting the accurate positions to the second computing device by the impact event reporting module 816
Analyzing the accurate positions of the objects/subjects by the second end users to understand the extent of the impact

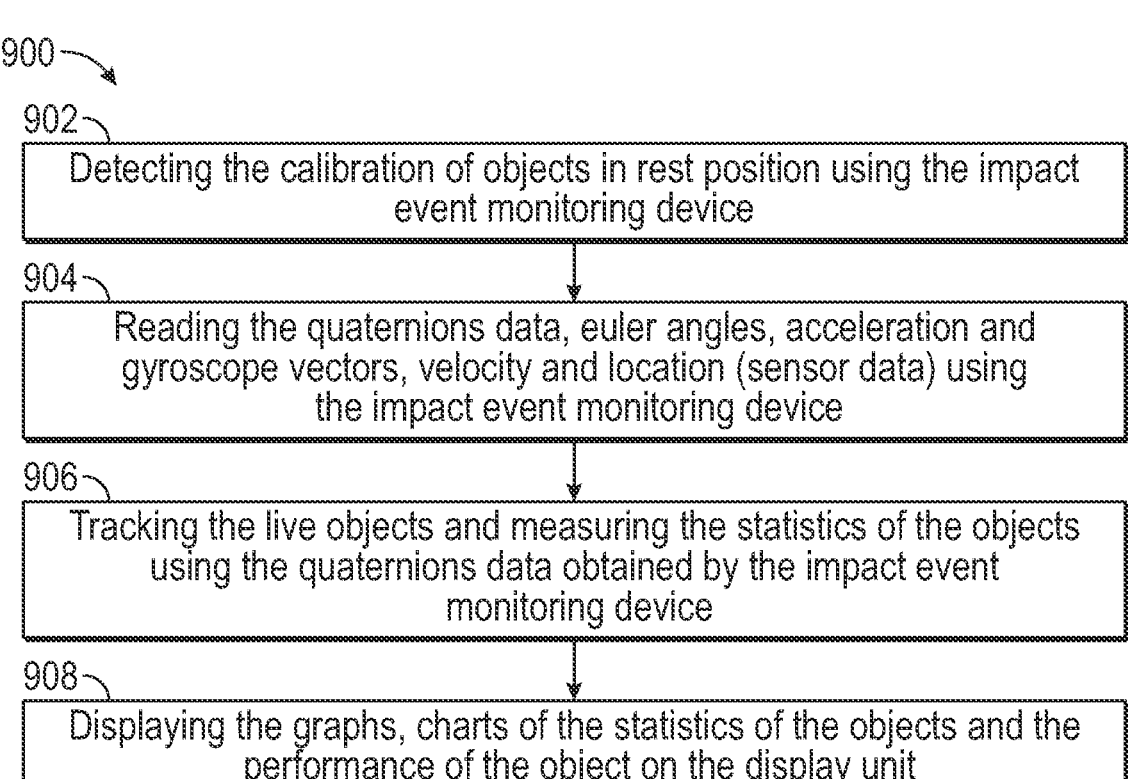

902

Detecting the calibration of objects in rest position using the impact event monitoring device

904

Reading the quaternions data, euler angles, acceleration and gyroscope vectors, velocity and location (sensor data) using the impact event monitoring device

906

Tracking the live objects and measuring the statistics of the objects using the quaternions data obtained by the impact event monitoring device

908

Displaying the graphs, charts of the statistics of the objects and the performance of the object on the display unit

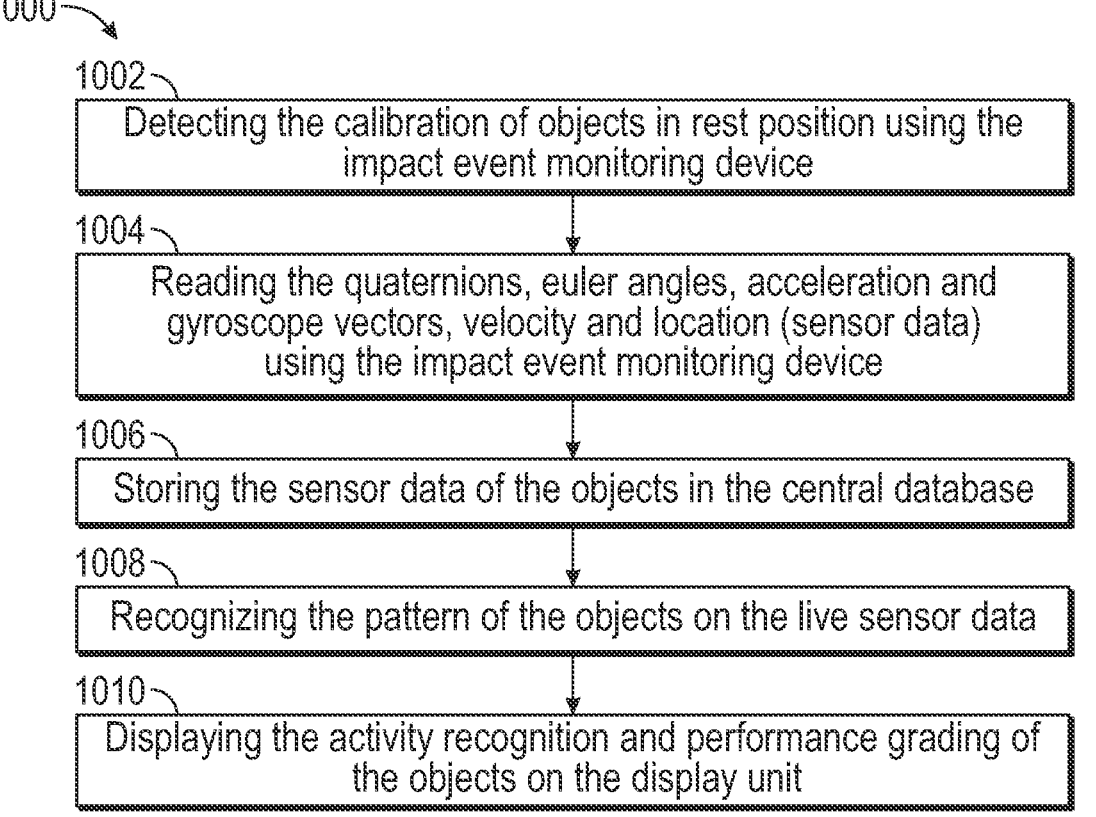

1002

Detecting the calibration of objects in rest position using the impact event monitoring device

1004

Reading the quaternions, euler angles, acceleration and gyroscope vectors, velocity and location (sensor data) using the impact event monitoring device

1006

Storing the sensor data of the objects in the central database

1008

Recognizing the pattern of the objects on the live sensor data

1010

Displaying the activity recognition and performance grading of the objects on the display unit

FIG. 10

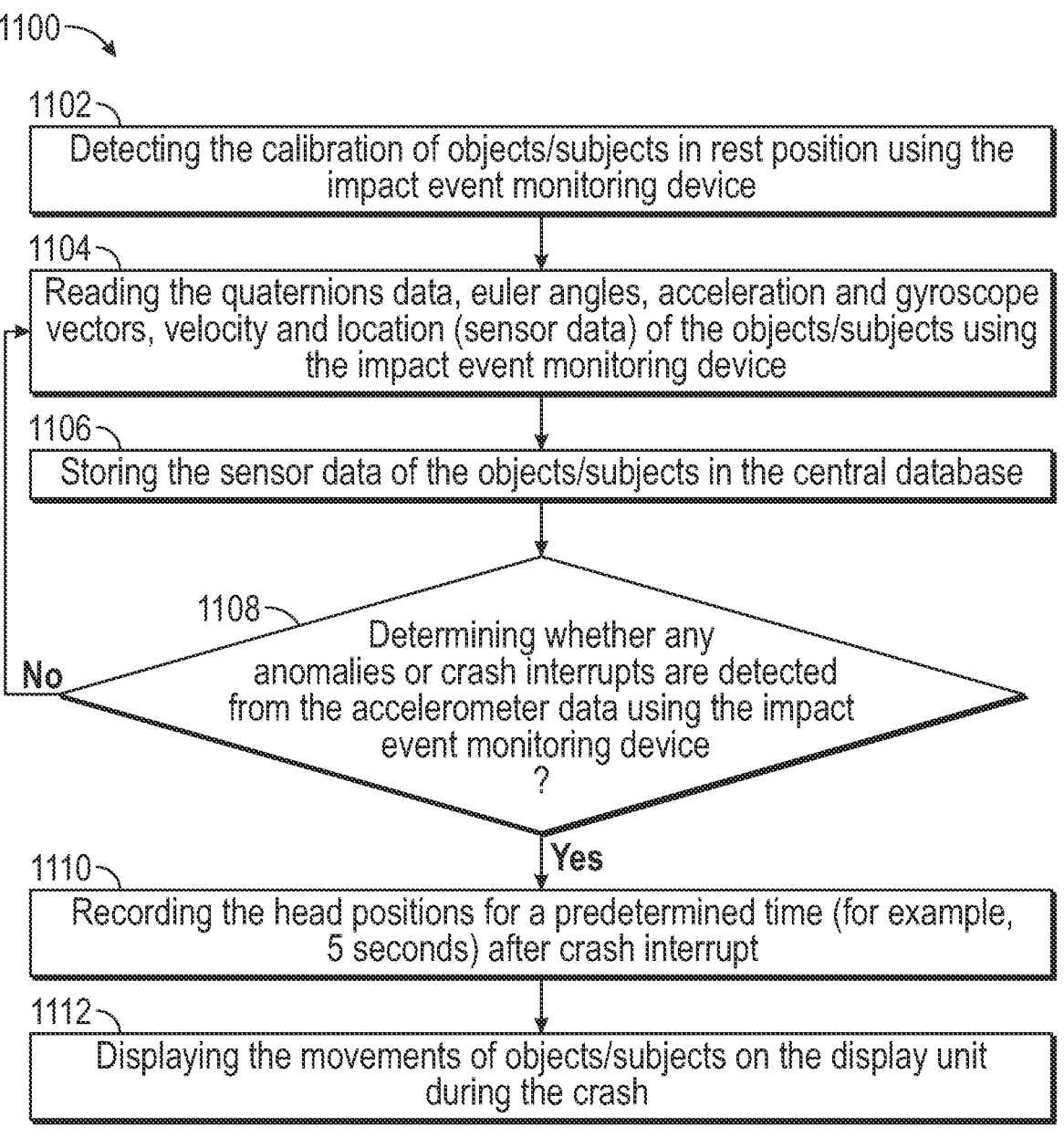

1100

1102
Detecting the calibration of objects/subjects in rest position using the impact event monitoring device 1104
Reading the quaternions data, euler angles, acceleration and gyroscope vectors, velocity and location (sensor data) of the objects/subjects using the impact event monitoring device 1106
Storing the sensor data of the objects/subjects in the central database 1108
Determining whether any anomalies or crash interrupts are detected from the accelerometer data using the impact event monitoring device ?

No

Yes

1110
Recording the head positions for a predetermined time (for example, 5 seconds) after crash interrupt 1112
Displaying the movements of objects/subjects on the display unit during the crash

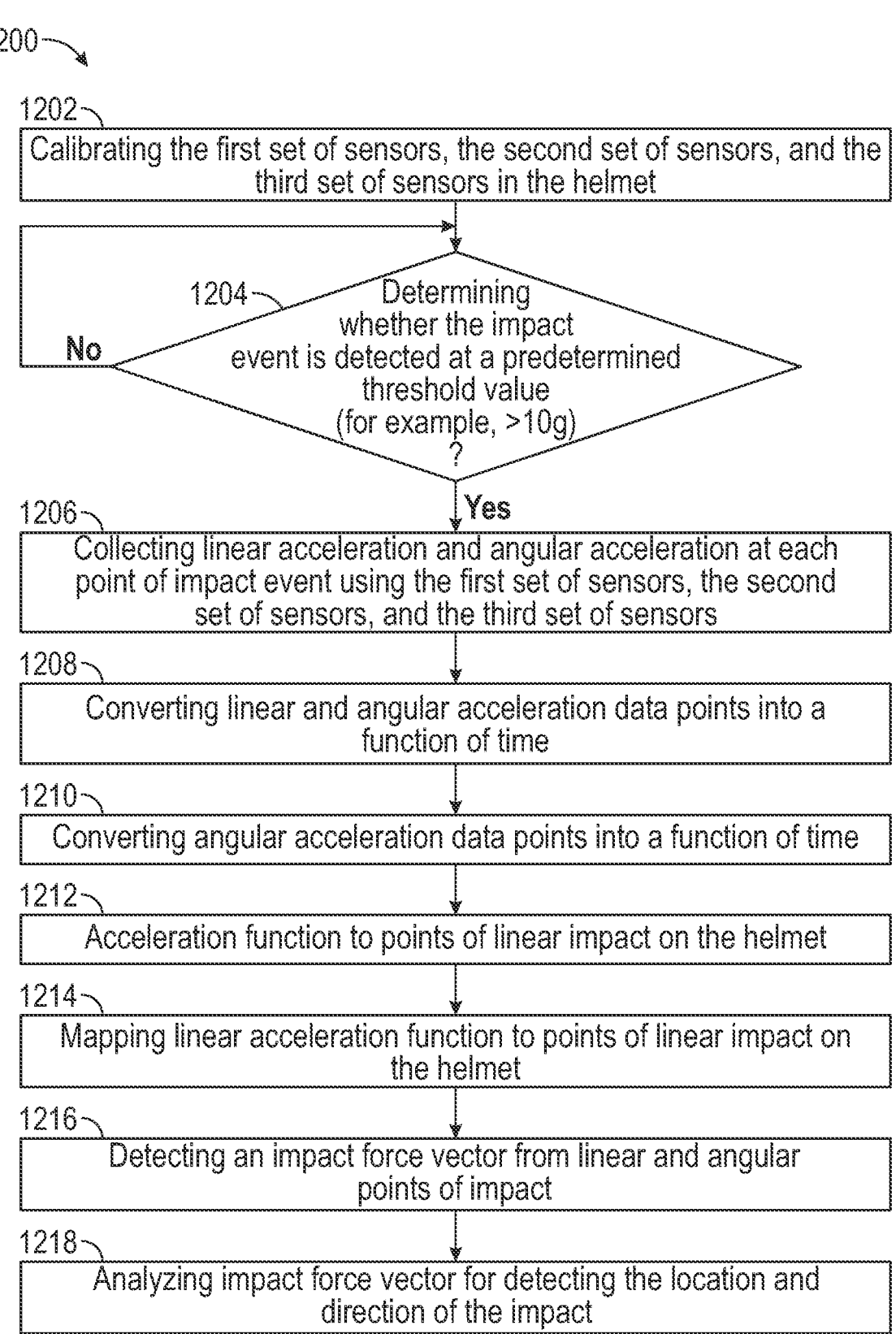

1202

Calibrating the first set of sensors, the second set of sensors, and the third set of sensors in the helmet 1204
Determining whether the impact event is detected at a predetermined threshold value (for example, >10g) ?

No

Yes

1206

Collecting linear acceleration and angular acceleration at each point of impact event using the first set of sensors, the second set of sensors, and the third set of sensors

1208

Converting linear and angular acceleration data points into a function of time

1210

Converting angular acceleration data points into a function of time

1212

Acceleration function to points of linear impact on the helmet

1214

Mapping linear acceleration function to points of linear impact on the helmet

1216

Detecting an impact force vector from linear and angular points of impact

1218

Analyzing impact force vector for detecting the location and direction of the impact

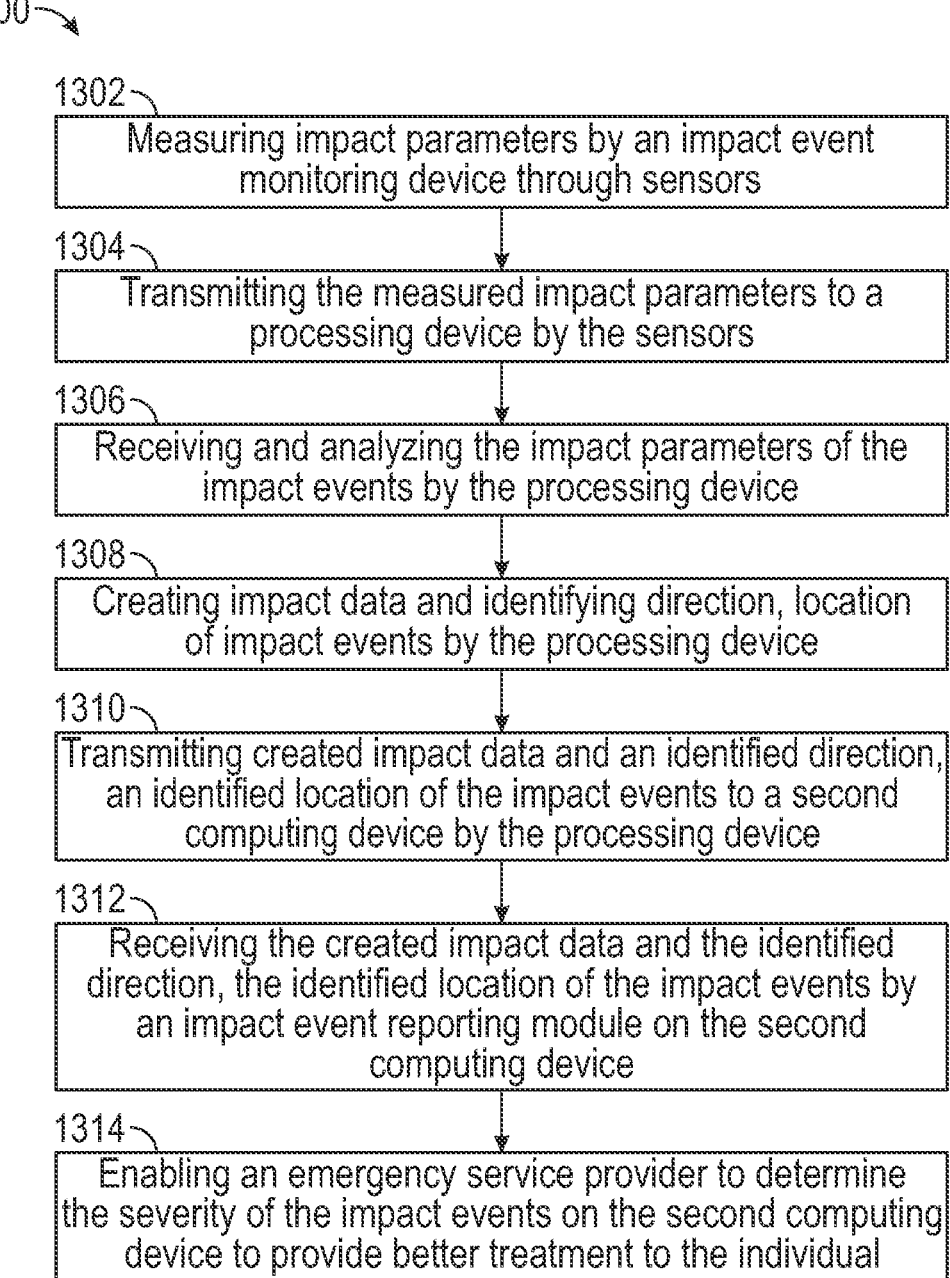

1302

Measuring impact parameters by an impact event monitoring device through sensors

1304

Transmitting the measured impact parameters to a processing device by the sensors

1306

Receiving and analyzing the impact parameters of the impact events by the processing device

1308

Creating impact data and identifying direction, location of impact events by the processing device

1310

Transmitting created impact data and an identified direction, an identified location of the impact events to a second computing device by the processing device

1312

Receiving the created impact data and the identified direction, the identified location of the impact events by an impact event reporting module on the second computing device

1314

Enabling an emergency service provider to determine the severity of the impact events on the second computing device to provide better treatment to the individual

SYSTEM AND METHOD FOR MONITORING, IDENTIFYING LOCATION AND DIRECTION OF IMPACT EVENTS IN REAL-TIME

CROSS-REFERENCE TO RELATED APPLICATIONS

This patent application claims priority benefit of U.S. Provisional Patent Application No. 63/332,734, entitled "SYSTEM AND METHOD FOR MONITORING, IDEN-TIFYING LOCATION AND DIRECTION OF IMPACT EVENTS IN REAL-TIME", filed on 20 Apr. 2022. The entire contents of the patent application is hereby incorpo-rated by reference herein in its entirety.

COPYRIGHT AND TRADEMARK NOTICE

This application includes material which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever.

TECHNICAL FIELD

The disclosed subject matter relates generally to an emer-gency event management system. More particularly, the present disclosure relates to a system and method for moni-toring, identifying the location and direction of impact events that occur to objects/subjects in real-time.

BACKGROUND

Generally, the participation of athletes in athletic activi-ties is increasing at all age levels and vehicles collisions occur due to the vehicle operator's fault, inattention, inex-perience, and distraction, resulting in injury and property damage. For example in athletic activities, all participants are potentially exposed to physical harm as a result of such participation. Physical harm is more likely to occur in athletic events where collisions between participants fre-quently occur (e.g., football, field hockey, lacrosse, ice hockey, soccer, and so forth). In connection with sports such as football, hockey, and lacrosse where deliberate collisions between participants occur, the potential for physical harm and/or injury is greatly enhanced. Each year there are a million athletes aged below twenty-four who play contact sports such as football, basketball, hockey, soccer, boxing, and mixed martial arts (MMA). All these young athletes are at risk for head injury with a concussion (concussive trau-matic brain injuries (CTBI)) and long-term brain dysfunc-tion due to repeated head impacts. These young athletes with developing neurological systems, suffer a large part of the 3.8 million CTBI that occur annually and are at high risk of developing long-term adverse neurological, physiological and cognitive deficits. The conditions of head impacts responsible for CTBI and potential long-term deficits in athletes are unknown. Head injuries are caused by positive and negative acceleration forces experienced by the brain and may result from linear or rotational acceleration (or both). Both linear and rotational acceleration are likely to be encountered by the head at impact, damaging neural and vascular elements of the brain. Existing methods to help for determining the location of the impact that occurs on objects/subjects and these methods may require a flat sur-face.

Similarly in vehicles collisions, the percentage of vehicu-lar crashes both on-road and off-road has been increasing rapidly all over the world. In most cases, the information on the state of the vehicle during the incident is not known. Many of the deaths and permanent injuries could have been prevented if the emergency responders would have arrived more quickly. Too many precious minutes are lost because calls for help are delayed, or because emergency responders cannot quickly locate the accident. Hence, there is a need for a system to sense the impact events and activate the emer-gency protocol examiners to properly diagnose the extent and severity of the injury.

In the light of the aforementioned discussion, there exists a need for a system with novel methodologies that would overcome the above-mentioned challenges.

SUMMARY

The following presents a simplified summary of the disclosure in order to provide a basic understanding of the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Exemplary embodiments of the present disclosure are directed towards a system and method for identifying loca-tion and direction of impact events in real-time.

An objective of the present disclosure is directed towards a system that provides a wirelessly linked impact, anomaly sensing, and reporting.

Another objective of the present disclosure is directed towards a system that activates an emergency protocol automatically by an impact event reporting module.

Another objective of the present disclosure is directed towards a system that measures one or more linear accel-erations at each point of the impact event.

Another objective of the present disclosure is directed towards a system that measures one or more angular accel-erations at each point of the impact event.

Another objective of the present disclosure is directed towards a system that identifies the location and direction of impact on a surface.

Another objective of the present disclosure is directed towards a system that identifies location and intensity of each impact and delivering location data and intensity of each impact data to medical examiners to properly diagnose the extent and severity of the injury.

Another objective of the present disclosure is directed towards a system that identifies the damage to the vehicle after the impact event.

Another objective of the present disclosure is directed towards a system that identifies the authenticity of insurance claims by identifying the exact/accurate location and inten-sity of the impact.

Another objective of the present disclosure is directed towards a system that delivers additional data to medical examiners to properly diagnose the extent and severity of the injury.

Another objective of the present disclosure is directed towards a system that identifies the accurate positions of head and/or body position of the subject and the geographical location of the object/subject at the time of the impact event and are analyzed by medical professionals to gauge the extent of the injury.

According to an exemplary embodiment of the present disclosure, a system includes an impact event monitoring device includes sensors, a processing device, and a memory unit, the sensors and the memory unit are electrically coupled to the processing device.

According to another exemplary embodiment of the present disclosure, the sensors is configured to measure one or more impact parameters. The impact parameters comprise quaternions, Euler angles, vital statistics, rotational angle of the head of the individual and the object, motion of the individual and the object, gyroscope vectors, and velocity.

According to another exemplary embodiment of the present disclosure, measured impact parameters are transmitted to the processing device. The processing device is configured to analyze the measured impact parameters to create impact data and identify direction, location of impact events. The impact data includes a linear acceleration, an angular acceleration, and an accurate location of the impact events.

According to another exemplary embodiment of the present disclosure, a second computing device includes an impact event reporting module. The impact event reporting module configured to receive the impact data and identify direction, location of the impact events from the processing device thereby enabling an emergency service provider to determine the severity of the impact events to provide better treatment to the individual.

BRIEF DESCRIPTION OF THE DRAWINGS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

FIG. 8 is a flowchart depicting an exemplary method for reporting impact events to an emergency service provider, in accordance with one or more exemplary embodiments.

FIG. 9 is a flowchart depicting an exemplary method for tracking the objects using the impact event monitoring device, in accordance with one or more exemplary embodiments.

FIG. 10 is a flowchart depicting an exemplary method for displaying the activity recognition and performance grading of the objects, in accordance with one or more exemplary embodiments.

FIG. 11 is a flowchart depicting an exemplary method for displaying the movements of objects/subjects during the crash, in accordance with one or more exemplary embodiments.

FIG. 12 is a flowchart depicting an exemplary method for detecting the location and direction of the impact after experiencing individual, in accordance with one or more exemplary embodiments.

FIG. 13 is a flowchart depicting an exemplary method for detecting the location and direction of the impact after experiencing individual, in accordance with one or more exemplary embodiments.

DETAILED DESCRIPTION OF EXAMPLE EMBODIMENTS

Figure 1:
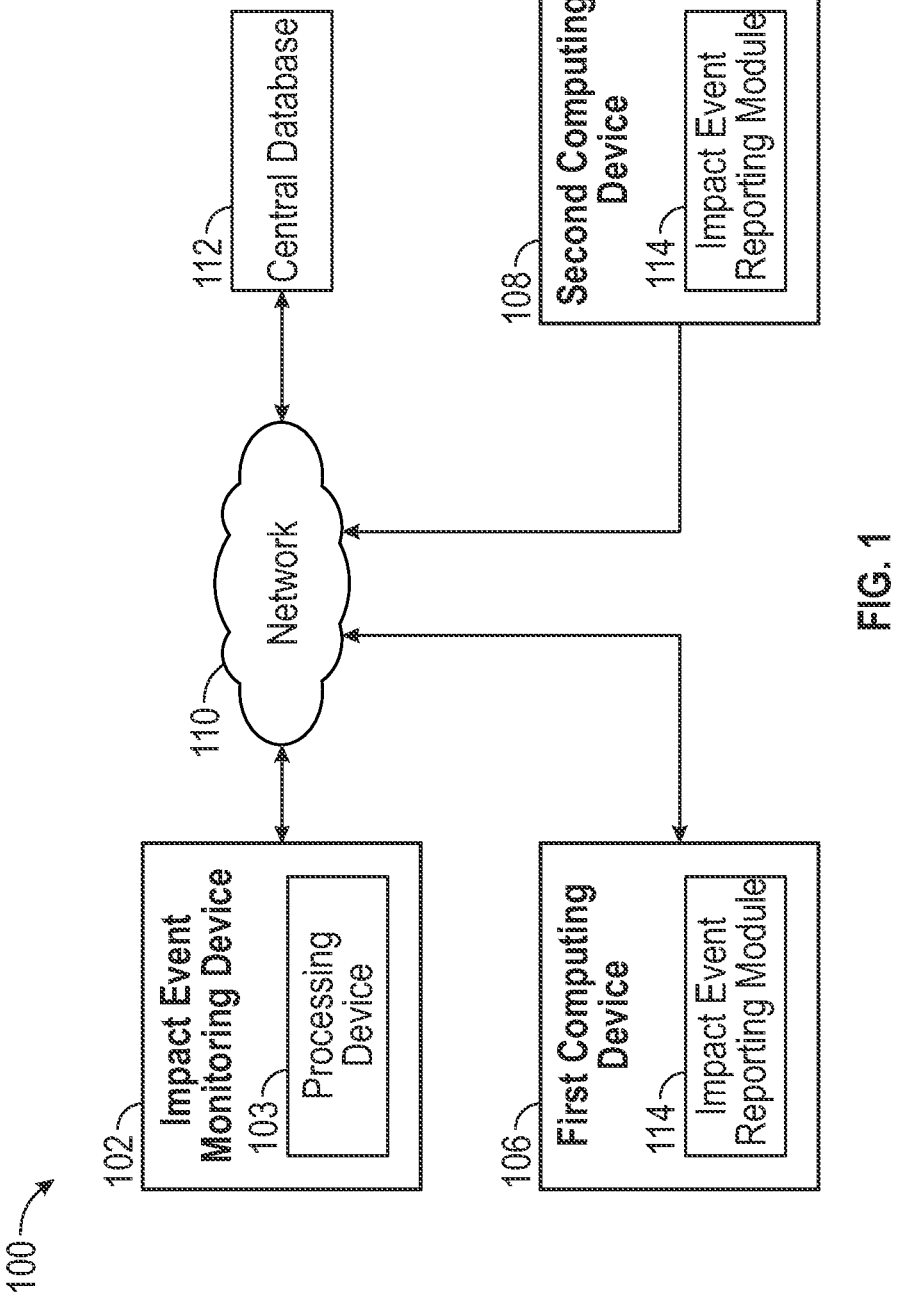
FIG. 1 is a block diagram depicting a schematic representation of a system for monitoring, identifying and reporting impact events occur to objects in real-time.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced items. Further, the use of terms "first", "second", and "third", and so forth, herein do not denote any order, quantity, or importance, but rather are used to distinguish one element from another.

Referring to FIG. 1 is a block diagram 100 depicting a schematic representation of a system for monitoring, identifying and reporting impact events that occur to objects in real-time, in accordance with one or more exemplary embodiments. The impact events may include, but not limited to, non-accidental emergency events relating to the vehicle (e.g., a theft of the vehicle), or emergency events relating specifically to the occupant(s) of the vehicle (e.g., a medical impairment of an occupant of the vehicle, regular events in the course of rough activity, a kidnapping or assault of an occupant of the vehicle, etc.), accidental emergency events relating to vehicle or other transport crashes, fires, medical emergencies, or other threats to safety, movements and motion, injury, abnormalities, and so forth. The system 100 includes an impact event monitoring device 102, a processing device 103, a first computing device 106, a second computing device 108, a network 110, a central database 112 and an impact event reporting module 114. The system 100 may include multiple impact event monitoring devices 102, multiple processing devices 103, and multiple computing devices 106, 108. The system 100 may link multiple impact event monitoring devices 102, multiple processing devices 103, and multiple computing devices 106, 108 into a single hub that may display devices information at a glance.

The impact event monitoring device 102 may be an inertial measurement unit. The impact event monitoring device 102 may be configured to detect and track an object's motion in three-dimensional space, and allows an individual to interact with the first computing device 106 by tracking motion in free space and delivering these motions as input commands The impact event monitoring device 102 may be integrated into a first object, the first object may be a vehicle. Here the impact event monitoring device 102 may be integrated into a steering wheel, a dashboard, car seats (if the user does not require an image capturing unit) of the vehicle. In an exemplary embodiment, the impact event monitoring device 102 may be integrated into headbands, helmets, electronic devices, products, and so forth. The impact event monitoring device 102 may be configured to detect/sense the impact events, emergency events, interrupts, impacts or anomalies occur to the objects/subjects. The impact event monitoring device 102 may be configured to activate the impact protocol (emergency protocol) to establish the communication with the first computing device 106 and the second computing device 108 through the impact event reporting module 114 via the network 110. The objects may include, but not limited to, vehicles, car seats, wristbands, helmets, headbands, and so forth. The subject may be the individual. The individual may include, but not limited to, a first end user, a driver, an athlete, a motorist, a passenger, a vehicle owner, a vehicle user, and so forth.

The network 110 may include but not limited to, an Internet of things (IoT network devices), an Ethernet, a wireless local area network (WLAN), or a wide area network (WAN), a Bluetooth low energy network, a ZigBee network, a WIFI communication network e.g., the wireless high speed internet, or a combination of networks, a cellular service such as a 4G (e.g., LTE, mobile WiMAX) or 5G cellular data service, a RFID module, a NFC module, wired cables, such as the world-wide-web based Internet, or other types of networks may include Transport Control Protocol/Internet Protocol (TCP/IP) or device addresses (e.g. network-based MAC addresses, or those provided in a proprietary networking protocol, such as Modbus TCP, or by using appropriate data feeds to obtain data from various web services, including retrieving XML data from an HTTP address, then traversing the XML for a particular node) and so forth without limiting the scope of the present disclosure. The impact event reporting module 114 may be configured to establish the communication between the impact event monitoring device 102 and the first computing device 106 through the network 110.

The first computing device 106 and the second computing device 108 may be operatively coupled to each other through the network 110. The first and second computing devices 106 and 108 may include but not limited to, a computer workstation, an interactive kiosk, and a personal mobile computing device such as a digital assistant, a mobile phone, a laptop, and storage devices, backend servers hosting the database and other software, and so forth. The first computing device 106 may be operated by the individual. The second computing device 108 may be operated by an emergency service provider. The emergency service provider may include, but not limited to, a second end user, medical professionals, a medical examiner(s), an emergency responder(s), an emergency authority medical practitioner (s), a doctor(s), a physician(s), transport industry authorities, vehicle industry authorities, insurance companies, a family member(s), a friend(s), a relative(s), a neighbour(s) and so forth.

Although the first and second computing devices 106, 108 are shown in FIG. 1, an embodiment of the system 100 may support any number of computing devices. Each computing device supported by the system 100 is realized as a computer-implemented or computer-based device having the hardware or firmware, software, and/or processing logic needed to carry out the intelligent messaging techniques and computer-implemented methodologies described in more detail herein.

The impact event reporting module 114, which is accessed as mobile applications, web applications, software that offers the functionality of accessing mobile applications, and viewing/processing of interactive pages, for example, are implemented in the first and second computing devices 106, 108 as will be apparent to one skilled in the relevant arts by reading the disclosure provided herein. The impact event reporting module 114 may be downloaded from the cloud server (not shown). For example, the impact event reporting module 114 may be any suitable applications downloaded from, GOOGLE PLAY® (for Google Android devices), Apple Inc.'s APP STORE® (for Apple devices, or any other suitable database). In some embodiments, the impact event reporting module 114 may be software, firmware, or hardware that is integrated into the first and second computing devices 106, 108.

The processing device 103 may include, but not limited to, a microcontroller (for example ARM 7 or ARM 11), a raspberry pi3 or a Pine 64 or any other 64 bit processor which can run Linux OS, a microprocessor, a digital signal processor, a microcomputer, a field programmable gate array, a programmable logic device, a state machine or logic circuitry, Arduino board. The impact event monitoring device 102 include multiple sensors (204a, 204b and 204c, 206a, 206b and 206c, 208a, 208b and 208c, as shown in FIG. 2) may be electrically coupled to the processing device 103.

According to exemplary embodiment of the present disclosure, a system for monitoring, identifying and reporting impact events in real-time, includes the impact event monitoring device configured to monitor the impact events of the objects and the subjects through the processing device 103, the processing device 103 may be configured to identify the accurate positions and locations, and the impact parameters of the objects and the subjects. The accurate positions and locations may include, but not limited to, a head and/or body position of the subject, a geographical position of the object, a geographical position of the subject and so forth. The impact parameters may include, but not limited to, quaternions, Euler angles, vital statistics, the rotational angle of the head of the individual or the object, movement and/or motion of the individual or the object, location acceleration and gyroscope vectors, velocity, location and so forth. The measured impact parameters may be transmitted to the processing device 103. The processing device 103 may be configured to analyze the measured impact parameters and create the impact data and identify direction, location of one or more impact events of the impact events. The impact data includes a linear acceleration, an angular acceleration, an accurate location of the impact events. The processing device 103 may be configured to enable the image capturing unit 216 (as shown in FIG. 2) to capture and record the objects and the subjects. Here subjects may include individual. The individual may include, but not limited to, a first end user, a driver, an athlete, a motorist, a passenger, a vehicle owner, a vehicle user, and so forth.

Figure 2:
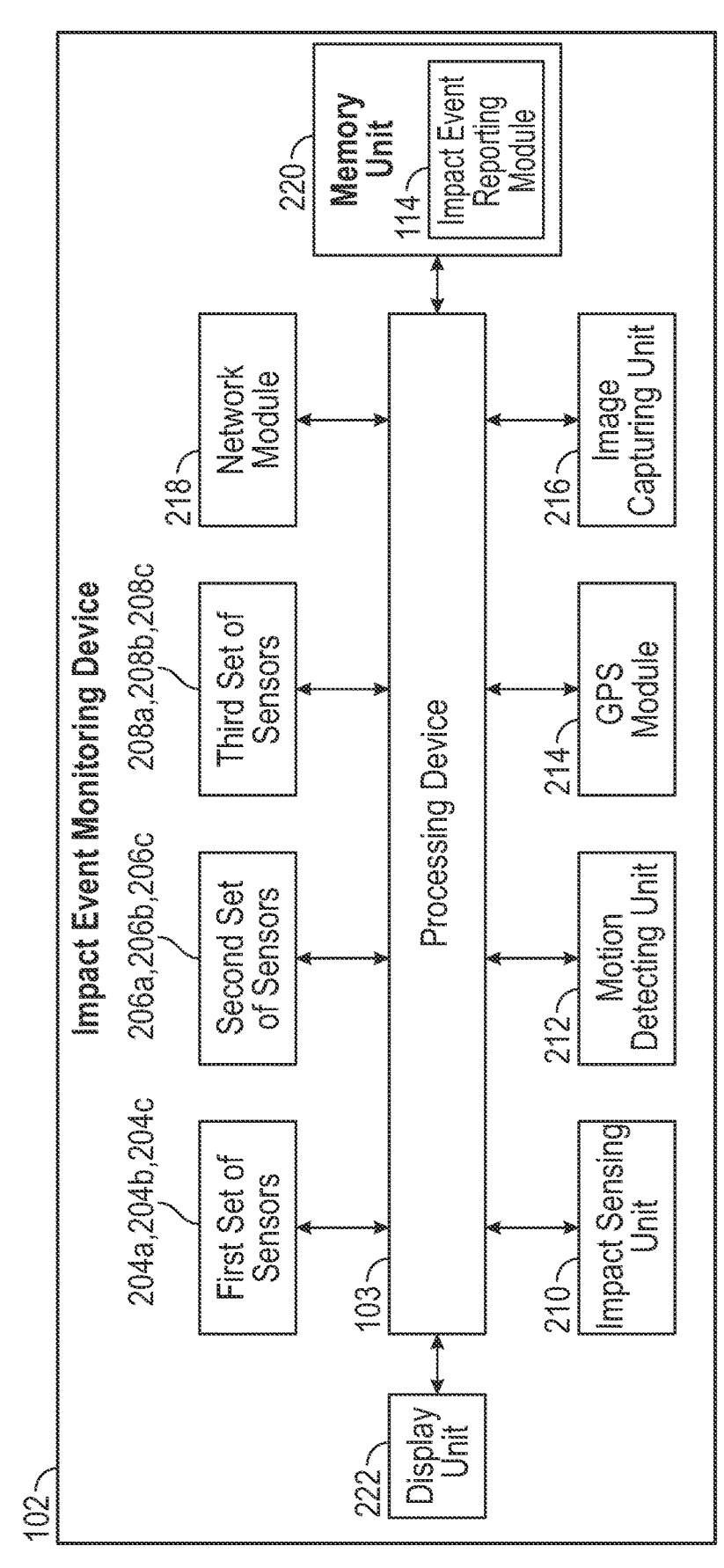
FIG. 2 is a block diagram depicting an impact event monitoring device shown in FIG. 1, in accordance with one or more exemplary embodiments.

The network module 218 (as shown in FIG. 2) configured to report the accurate positions and locations, the impact parameters, media files of the impact events to the first computing device 106 and the second computing device 108. The media files may include, but not limited to, images, pictures, videos, GIF's, and so forth. The second computing device 108 includes an impact event reporting module 114. The impact event reporting module 114 may be configured to receive the impact data of the impact events from the processing device 103. The impact event reporting module 114 may be configured to enable the emergency service provider to determine the severity of the impact events on the second computing device 108 to provide better treatment to the individual. The impact event reporting module 114 configured to enable the first computing device 106 and the second computing device 108 to analyze the accurate positions and locations of the objects and the subjects to understand the extent of the impact events.

According to exemplary embodiment of the present disclosure, the system for monitoring, identifying and reporting impact events in real-time, comprising an impact event monitoring device 102 may be configured to monitor impact events of objects; and subjects, the impact event monitoring device 102 may be configured to identify the accurate positions and locations of the objects and the subjects and activates the impact protocol to establish communication with the first computing device 106 and the second computing device 108 over the network 110, the impact event monitoring device 102 may be configured to deliver notifications of the impact events of the objects and subjects to the second computing device 108 over the network 110.

A method for monitoring, identifying and reporting impact events in real-time, comprising: monitoring the objects and the subjects by the event monitoring device 102; detecting the accurate positions, the locations, and the impact parameters by the impact event monitoring device 102; capturing and recording the objects and the subjects and establishing the communication between the impact event monitoring device 102 with the first computing device 106 and the second computing device 108 through the network module 218; transmitting the impact data of the impact events to the second computing device by the processing device; receiving the impact data of the impact events by the impact event reporting module on the second computing device. The impact data includes accurate positions and locations; the impact parameters; media files; enabling the emergency service provider to determine the severity of the impact events on the second computing device to provide better treatment to the individual.

Referring to FIG. 2 is a block diagram 200 depicting the impact event monitoring device 102 shown in FIG. 1, in accordance with one or more exemplary embodiments. The impact event monitoring device 102 includes the processing device 103, multiple sensors include a first set of sensors 204a, 204b and 204c, a second set of sensors 206a, 206b and 206c, a third set of sensors 208a, 208b, and 208c, an impact sensing unit 210, a motion detecting unit 212, a GPS module 214, an image capturing unit 216, and a network module 218, a memory unit 220, and a display unit 222. The first set of sensors 204a, 204b, 204c, the second set of sensors 206a, 206b and 206c, the third set of sensors 208a, 208b, and 208c may include, but not limited to, gyroscopes, accelerometers, compasses, pressure sensors, and magnetometers.

The first set of sensors 204a, 204b, and 204c may be electrically coupled to the processing device 103 and is configured to measure the linear acceleration, and the angular acceleration at each point during the impact event. The second set of sensors 206a, 206b, and 206c may be electrically coupled to the processing device 103 and is configured to calibrate the exact orientations by measuring the Euler angles and/or quaternions. The third set of sensors 208a, 208b and 208c may be electrically coupled to the processing device 103 and is configured to monitor vital statistics, the rotational angle of the head of the individual or the object at the time of the impact event. The third set of sensors 208a, 208b and 208c may also be configured to provide additional data to the emergency service provider to properly diagnose the extent and severity of the impact event. The impact sensing unit 210 may be electrically coupled to the processing device 103 and is configured to detect and determine the impact events that occur to the objects/subjects. The motion detecting unit 212 may be electrically coupled to the processing device 103 and is configured to measure changes in the orientations for having a continuous replication of the movement and/or motion of the objects/subjects. Based on the motion detection unit 212, identifying the location and direction of an impact on a surface.

The GPS module 214 may be electrically coupled to the processing device 103 and is configured to detect the accurate location of the impact event that occur to the objects/subjects. The image capturing unit 216 may be electrically coupled to the processing device 103 and is configured to record the video of the subjects/objects and capture the objects/subjects. For example, similar to live media, in the sense the image capturing unit 216 starts recording as soon as the individual opens the impact event reporting module 114 before the live media is captured. The live media may include, but not limited to, live photos, live media files, and so forth. The image capturing unit 216 may be configured to recreate the captured impact events (live media) in a 3D space. The network module 218 may be electrically coupled to the processing device 103 and is configured to connect the impact event monitoring device 102 with the first computing device 106. The network module 218 may be configured to send the impact data and identified location and direction of the impact events as impact notifications to the emergency service provider 108. The impact notifications may include, but not limited to, SMS, alerts, email, warnings, and so forth. The network module 218 may also be configured to send a geographical location as a communication link and the information identifying the location of the objects\subjects to the second computing device 108 to communicate the portion of data stored in the memory unit 220. The information stored in the memory unit 220 may be preserved at least until an acknowledgment of receipt is received representing successful transmission through the communication link. The memory unit 220 may be electrically coupled to the processing device 103 and is configured to receive movement or motion output and stores at least a portion of motion commencing at and/or before said determination. The memory unit 220 may include the impact event reporting module 114. The display unit 222 may be electrically coupled to the processing device 103 and is configured to display the impact parameters, impact notifications, and so forth.

According to exemplary embodiment of the present disclosure, the impact event monitoring device 102 includes the first set of sensors 204a, 204b, and 204c configured to measure the linear acceleration and the angular acceleration of the sensor array. The second set of sensors 206a, 206b, and 206c are configured to calibrate orientations of the objects and the subjects by measuring Euler angles and/or quaternions. The third set of sensors 208a, 208b, and 208c are configured to monitor the vital statistics, rotational angle of the head of the subject at the time of the impact event. The third set of sensors 208a, 208b, and 208c are configured to provide additional impact parameters to the second computing device 108 for proper diagnosing the extent and severity of the impact events, and estimating the impact intensity of to object/subject. The emergency service provider includes the transport industry authorities, a second end user, vehicle industries authorities and insurance companies of the object/ subject can estimate the impact intensity to object/subject.

The impact sensing unit 210 may be configured to detect and determine the impact events that occurs to the objects and the subjects. The motion detecting unit 212 may be configured to measure changes in the orientations for continuous replication of a movement and/or motion of the objects and the subjects. The GPS module 214 may be configured to detect the accurate location of the impact events that occurs to the objects and the subjects. The network module 218 may be configured to establish communication between the impact event monitoring device 102 and the first computing device 106, the second computing device 108 to deliver notifications of the impact events. The network module 218 may be configured to send the communication link with the remote location, and the information identifying the location of the objects and the subjects to the second computing device 108 for communicating the impact parameters stored in the memory unit 220 of the impact event monitoring device 102.

Figure 3:
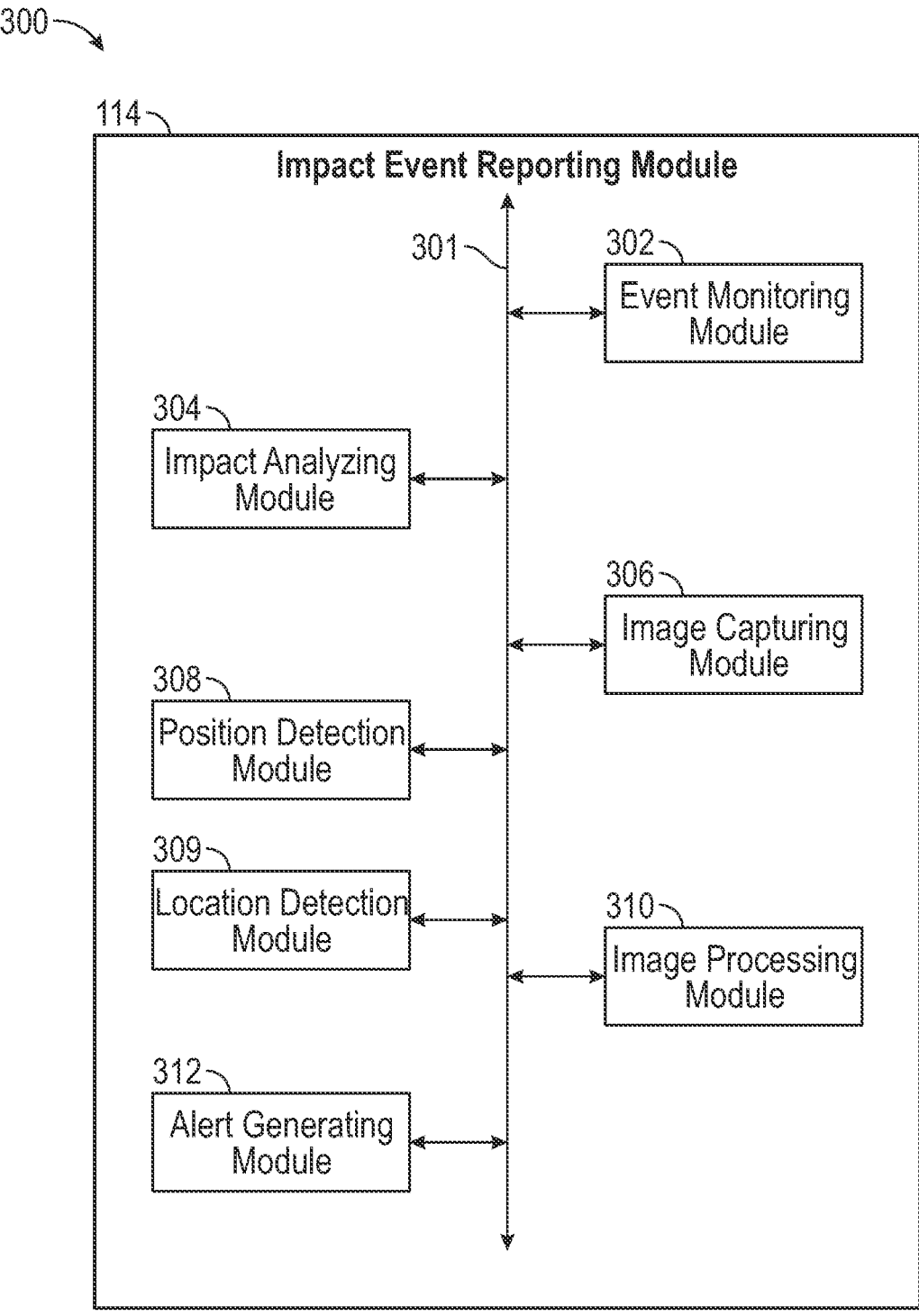
FIG. 3 is a block diagram depicting a schematic representation of the impact event reporting module shown in FIG. 1, in accordance with one or more exemplary embodiments.

Referring to FIG. 3 is a block diagram 300 depicting a schematic representation of the impact event reporting module 114 shown in FIG. 1, in accordance with one or more exemplary embodiments. The impact event reporting module 114 includes a bus 301, an event monitoring module 302, an impact analyzing module 304, an image capturing module 306, a position detection module 308, a location detection module 309, and an image processing module 310, and an alert generating module 312. The bus 301 may include a path that permits communication among the modules of the impact event reporting module 114 installed on the computing device 106, 108. The term "module" is used broadly herein and refers generally to a program resident in the memory of the computing device 106, 108. The impact event reporting module 114 may include machine learning techniques and computer-implemented pattern recognition techniques to detect anomalies or variations in normal behavior.

The impact event monitoring module 302 may be configured to read the impact parameters of the objects/subjects and stores in the central database 112. The impact parameters may be measured by the impact event monitoring device 102. The impact parameters may include, but not limited to, quaternions, Euler angles, vital statistics, the rotational angle of the head of the individual or the object, movement and/or motion of the individual or the object, geo location, acceleration and gyroscope vectors, velocity, location and so forth. The impact analyzing module 304 may be configured to analyze the impact events received from the processing device 103. The image capturing module 306 may be configured to capture the objects/subjects. The image capturing module 306 may be configured to move the media files of the impact event front and back with respect to time so that the second end-user may see the impact event from any angle. The media files may include, but not limited to, images, pictures, videos, GIF's, and so forth. The media files may be moved front and back with respect to time and the object/subject may be portrayed accordingly.

The position detection module 308 may be configured to fetch the object/subject positions "x" seconds before the impact interrupt and "x" seconds after the impact interrupt. The image processing module 310 may be configured to convert the resulting "2x" seconds of the object/subject positions into a short animation/video by which the accurate object/subject positions at the time of the impact event may be reproduced. The alert generating module 312 may be configured to generate the impact notifications to the second computing device 108 to estimate the extent of the impact event by the emergency service provider. The impact notifications may enable the emergency service provider to determine and understand the severity of the impact event.

According to exemplary embodiment of the present disclosure, the impact event reporting module 114 includes the event monitoring module 302 may be configured to read the impact parameters of the objects and the subjects. The impact analyzing module 304 may be configured to analyze impact events received from the processing device 102. The image capturing module 306 may be configured to move the media files of the impact events front and back with respect to time and the object/subject may be portrayed accordingly. The position detection module 308 may be configured to fetch a head and/or body position of the subjects before the impact events and after the impact events. The location detection module 309 may be configured to fetch the geographical location (geo location) of the objects and/or subjects, before the impact events and after the impact events. The alert generating module 312 may be configured to deliver the notifications of the impact events to the second computing device 108 for estimating the extent of the impact vents by the emergency service provider.

Figure 4:
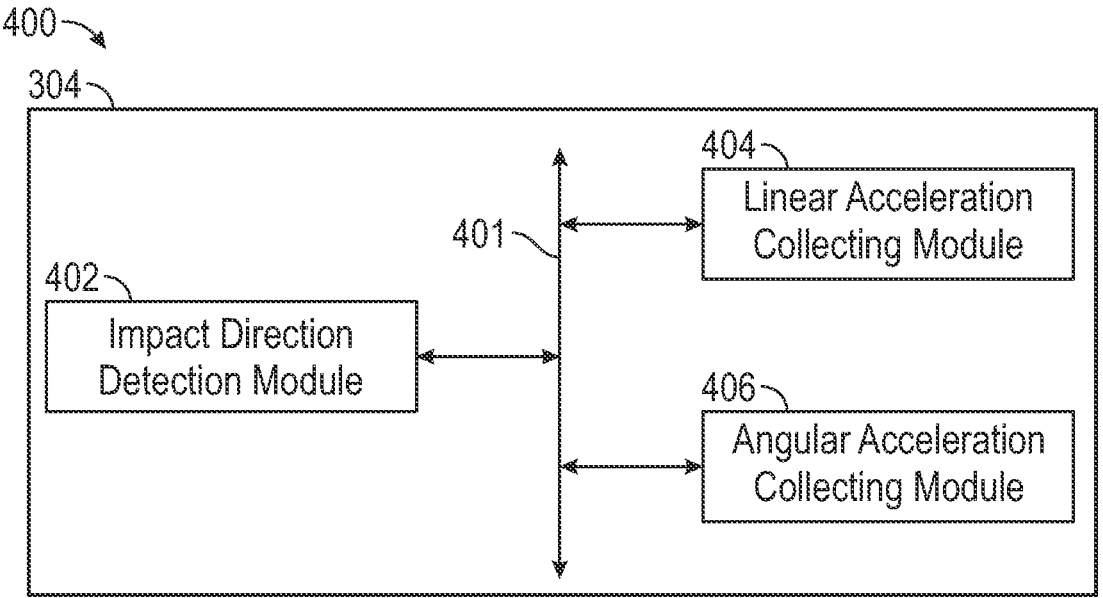
FIG. 4 is a block diagram depicting a schematic representation of the impact analyzing module shown in FIG. 3, in accordance with one or more exemplary embodiments.

Referring to FIG. 4 is a block diagram 400 depicting a schematic representation of the impact analyzing module 304 shown in FIG. 3, in accordance with one or more exemplary embodiments. The impact analyzing module 304 includes a bus 401, an impact direction detecting module 402, a linear acceleration collecting module 404, an angular acceleration collecting module 406. The bus 401 may include a path that permits communication among the modules of the impact analyzing module 304 installed on the computing devices 106, 108. The linear acceleration collecting module 404 may be configured to collect the linear acceleration data of every point of the impact. The angular acceleration collecting module 406 may be configured to collect the angular acceleration data of every point of the impact. The impact direction detecting module 402 may be configured to construct the object force as function of time during the impact event using this linear acceleration data and angular acceleration data. Here object may be a helmet. The force vector on the object may be used to construct the impact force vector by analyzing the transfer of momentum during the impact event.

Figure 5:
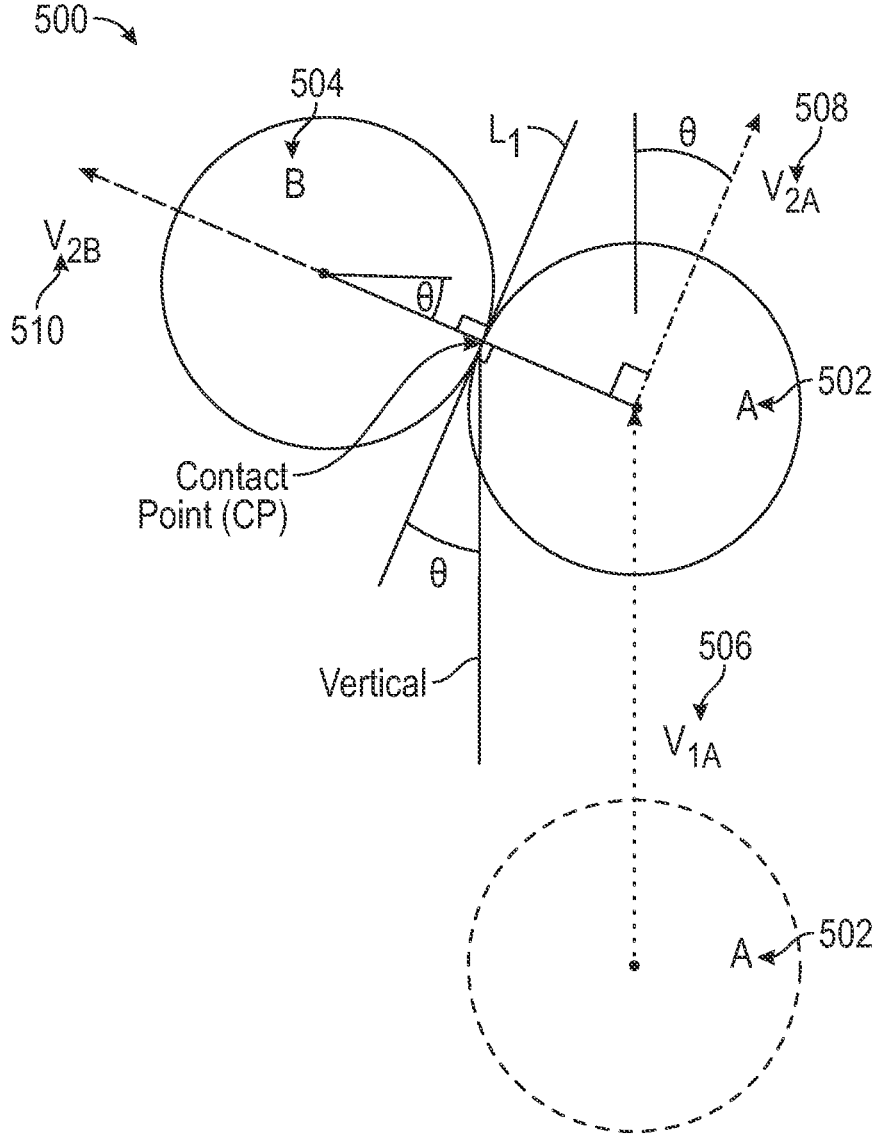
FIG. 5 is an exemplary embodiment of the impact direction detecting module shown in FIG. 4, in accordance with one or more exemplary embodiments.

Referring to FIG. 5 is an exemplary embodiment 500 depicting a schematic representation of the impact direction detecting module 402 to analyze transferring of momentum during the impact between objects. The diagram 500 may include a helmet (A) 502, an object (B) 504, an initial velocity rider with the helmet (V1A) 506, a final velocity of the helmet after an impact (V2A) 508, a final velocity of an object (V2B) 510. Here objects may include but not limited to vehicles etc. If objects may have an elastic collision. The elastic collision is one in which the kinetic energy of the objects may be conserved before and after impact. If that object that hits is in the stationary position. After the impact, analyze conversation of linear momentum For the helmet and object for conservation of linear momentum is:

$$m_A \vec{V}_{1A} = m_A V_{2A} + m_A \vec{V}_{2B} \qquad\qquad 1$$

For an elastic collision kinetic energy is conserved, and the equation is:

$$\tfrac{1}{2} m_A (V_{1A})^2 = \tfrac{1}{2} m_A (V_{2A})^2 + \tfrac{1}{2} m_B (V_{2B})^2 \qquad 2$$

Finding $V_{2B}$ and $V_{2A}$ vector from the above 2 equations. The $V_{2B}$ vector will pass through a contact point of the impact. Find out the contact point as the last point of the helmet which pass through the vector $V_{2B}$.

The opposite of the vector V2B=>-V2B will be the direction of the impact on the helmet.

Figure 6A:
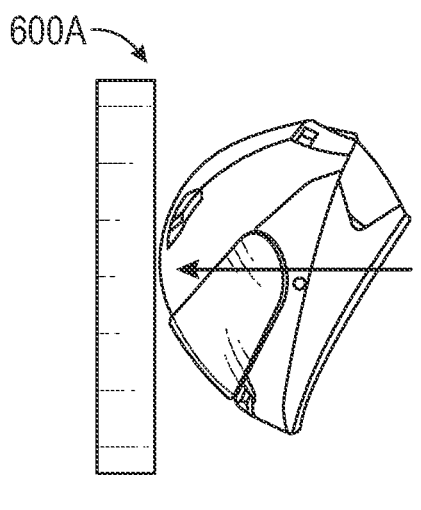
FIG. 6A, and FIG. 6B are exemplary embodiments depicting schematic representations of the head-on collision of two objects, in accordance with one or more exemplary embodiments.
Figure 6B:
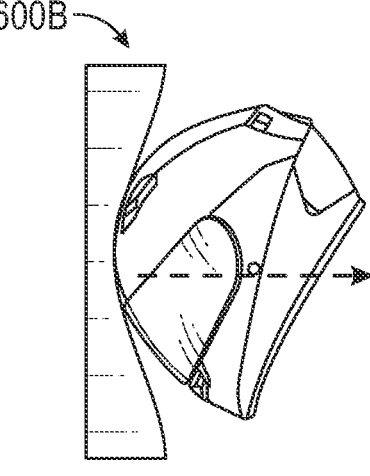

Referring to FIG. 6A, and FIG. 6B are exemplary embodiments 600a, 600b depicting a schematic representation of the head-on collision of two objects. The diagram 600a, 600b may include an object (A) 602, and an object (B) 604. Here the object (A) may include a vehicle, a helmet and so forth, and the object (B) may include may include a road, a pavement, a pedestrian or another vehicle. FIG. 6A depicting a head-on collision of two objects as per conservation of linear momentum.

The momentum of impact may be distributed among the two objects (i.e. the object (A) and the object (B)). Whereas FIG. 6B depicts one of the objects (for example: the object (A)) of impact is a rigid body the majority of the momentum of impact may be transferred back to other object (B) in a collision. In FIG. 6B depicts the kinetic energy of the objects (A,B) may be conserved after impact.

$$\tfrac{1}{2} m_a v_a^2 = \tfrac{1}{2} m_a \underline{v}_a^2 + \tfrac{1}{2} m_b (\Delta v_b)^2$$

where $\Delta v_b \rightarrow 0$ (tends to 0) and $\underline{v}_a \rightarrow v_a$ (tends to original velocity)

For other types of collisions, if one of the object (B) is a rigid body the object (A) will experience both a linear and rotational motion transferred back from the collision. The angular velocity of the rotational motion may directly proportional to the angle of the impact.

The object (B) may be free on all axis, the rotational velocity may be shown on all the three axes. The rotational velocity on each axis may be different proportional to the plane of the impact based on the impact location. If impact has occurred on Y-Z plane, then rotational velocities are high on the Y and Z axis. The impact location quadrant may be determined based on the magnitude of the velocity and the plane of the impact, the impact location. This quadrant may be mapped by observing different magnitude levels and axis of rotation.

Figure 6C:
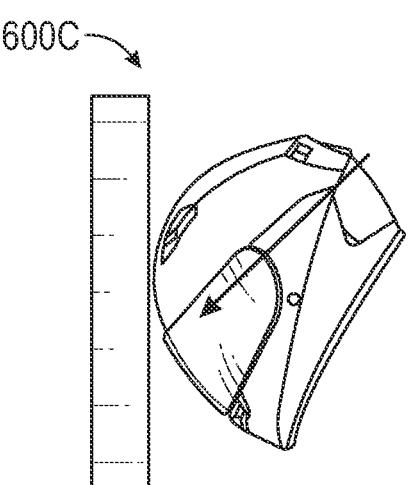
FIG. 6C, and FIG. 6D are another exemplary embodiments depicting schematic representations of the head-on collision of two objects, in accordance with one or more exemplary embodiments.
Figure 6D:
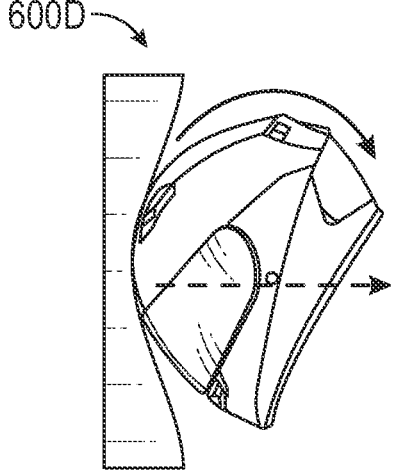

Referring to FIG. 6C, and FIG. 6D are another exemplary embodiments 600c, and 600d depicting a schematic representation of the head-on collision of two objects. The diagram 600a, and 600b may include an object (A) 602, and an object (B) 604. Here the object (A) may include the vehicle, the helmet and so forth., and the object (B) may include may include a road, a pavement, a pedestrian or another vehicle.

FIG. 6C depicting a head-on collision of two objects as per conservation of linear momentum. The momentum of impact may be distributed among the two objects (i.e. the object (A) and the object (B)). Whereas FIG. 6D depicts one of the objects (for ex: the object (A)) of impact is a rigid body and the majority of the momentum of impact may be transferred back to other object (B) in a collision. In FIG. 6D depicts the kinetic energy of the objects (A,B) may be conserved after impact (shown in FIG. 6C).

$$\tfrac{1}{2} m_a v_a^2 = \tfrac{1}{2} m_a \underline{v}_a^2 + \tfrac{1}{2} m_b (\Delta v_b)^2$$

where $\Delta v_b \rightarrow 0$ (tends to 0) and $\underline{v}_a \rightarrow v_a$ (tends to original velocity)

For other types of collisions, if one of the object (B) is a rigid body the object (A) will experience both a linear and rotational motion transferred back from the collision. The angular velocity of the rotational motion may directly proportional to the angle of the impact.

The object (B) may be free on all axis, the rotational velocity may be shown on all the three axes. The rotational velocity on each axis may be different proportional to the plane of the impact based on the impact location. If impact has occurred on Y-Z plane, then rotational velocities are high on the Y and Z axis. The impact location quadrant may be determined based on the magnitude of the velocity and the plane of the impact, the impact location. This quadrant may be mapped by observing different magnitude levels and axis of rotation.

Figure 6E:
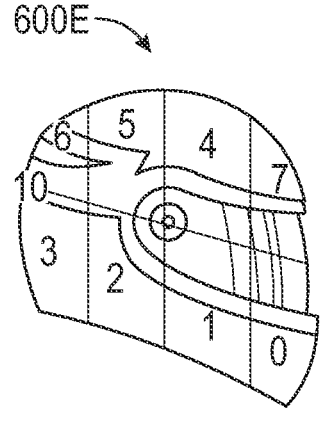
FIG. 6E, FIG. 6F, FIG. 6G are exemplary embodiments depicting the first object in different angles during a collision with another object, in accordance with one or more exemplary embodiments.
Figure 6F:
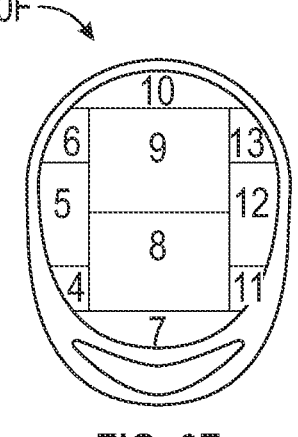
Figure 6G:
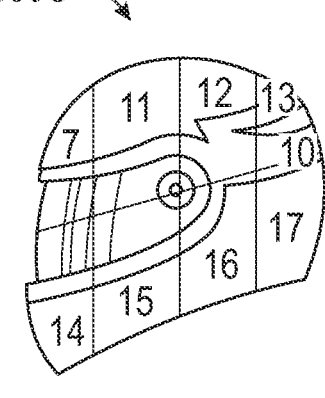

Referring to FIG. 6E, FIG. 6F, FIG. 6G are exemplary embodiments 600e, 600f, 600g depicts the first object in different angles during a collision with another object.

Figure 7:
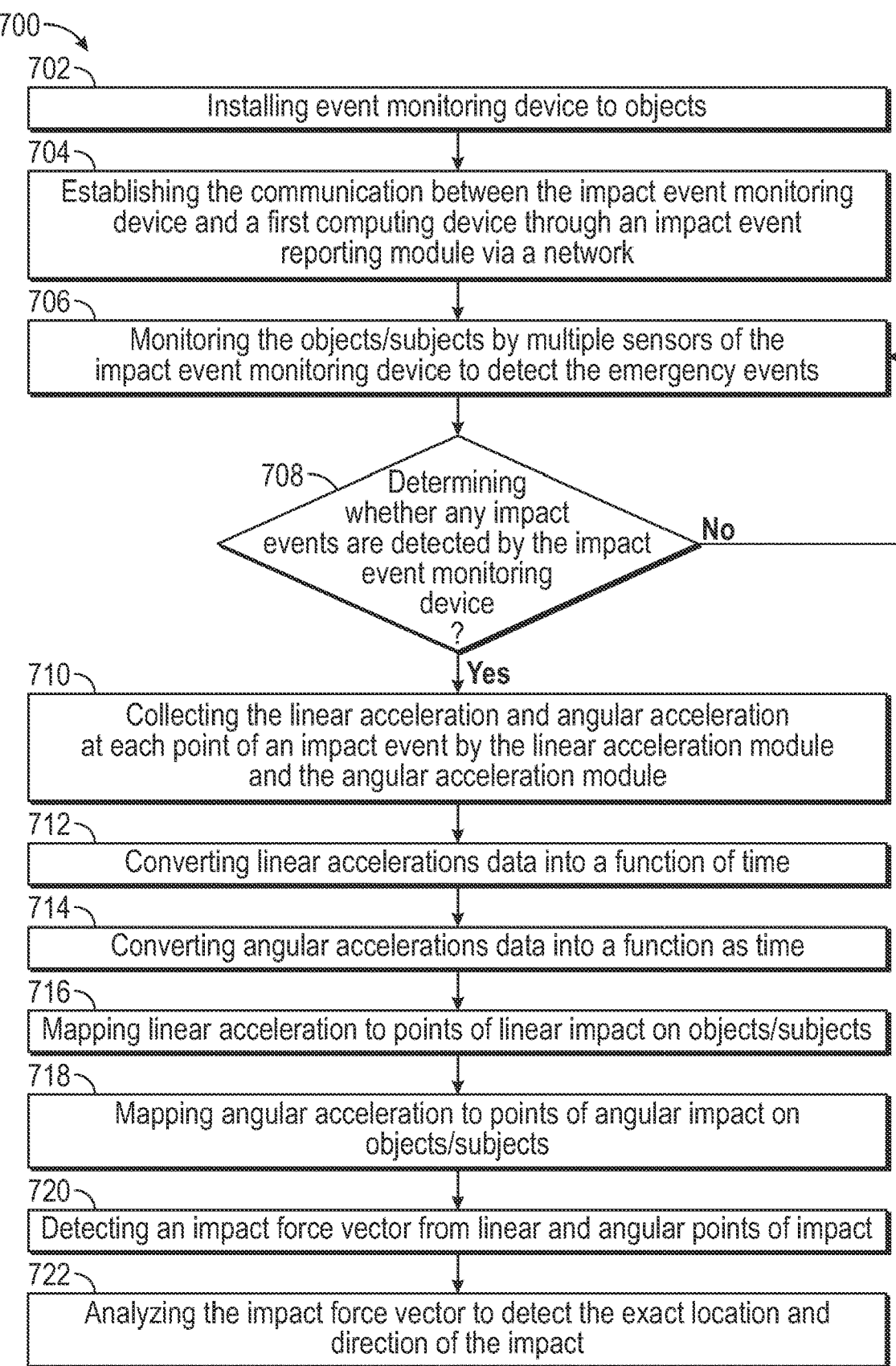
FIG. 7 is a flowchart depicting an exemplary method for analyzing the direction of impact, in accordance with one or more exemplary embodiments.

Referring to FIG. 7 is a flowchart 700 depicting an exemplary method for analyzing the direction of impact, in accordance with one or more exemplary embodiments. As an option, the exemplary method 700 is carried out in the context of the details of FIG. 1, FIG. 2, FIG. 3, FIG. 4, FIG. 5, FIG. 6A, FIG. 6B, FIG. 6C, FIG. 6D, FIG. 6E, FIG. 6F, and FIG. 6G. However, the exemplary method 700 is carried out in any desired environment. Further, the aforementioned definitions are equally applied to the description below.

The method commences at step 702, installing event monitoring device to objects. Thereafter at step 704, establishing the communication between the impact event monitoring device and a first computing device through an impact event reporting module via a network. Thereafter at step, 706, monitoring the objects/subjects by multiple sensors of the impact event monitoring device to detect the emergency events. Determining whether any impact events are detected by the impact event monitoring device at step 708. If the answer to step 708 is YES, the method continuous at step 710, collecting the linear acceleration and angular acceleration at each point of an impact by the linear acceleration module and the angular acceleration module. Thereafter at step 712, converting linear acceleration data into a function of time. Thereafter at step 714, converting angular acceleration data into a function as time. Thereafter at step 716, mapping linear acceleration to points of linear impact on objects/subjects. Thereafter at step 718, mapping angular acceleration to points of angular impact on objects/subjects. Here the objects may include but not limited to vehicle, subject may be an individual. Thereafter at step 720, detecting an impact force vector from linear and angular points of impact. Thereafter at step 720, analyzing the impact force vector to detect the exact/accurate location and direction of the impact. If the answer to step 708 is NO, the method redirects at step 706.

Referring to FIG. 8 is a flowchart 800 depicting an exemplary method for reporting impact events to the emergency service provider, in accordance with one or more exemplary embodiments. As an option, the exemplary method 800 is carried out in the context of the details of FIG. 1, FIG. 2, FIG. 3, FIG. 4, FIG. 5, FIG. 6A, FIG. 6B, FIG. 6C, FIG. 6D, FIG. 6E, FIG. 6F, FIG. 6G and FIG. 7. However, the exemplary method 800 is carried out in any desired environment. Further, the aforementioned definitions are equally applied to the description below.

The method commences at step 802, installing the impact event monitoring device to objects. Thereafter at step 804, establishing the communication between the impact event monitoring device and the first computing device through the impact event reporting module via the network. Thereafter at step 806, monitoring the objects/subjects by the impact event monitoring device to detect the impact events occur to the objects/subjects. Determining whether any impact events, interrupts, impacts or anomalies detected by the impact event monitoring device, at step 808. If the answer to step 808 is YES, the method continuous at step 810, capturing the objects/subjects positions "x" seconds before the impact event and "x" seconds after the impact event by the image capturing unit. Thereafter at step 812, converting the media files of objects/subjects into an animation video to detect the accurate positions and locations of the objects/subjects at the time of the impact event. Thereafter at step 814, detecting the accurate positions and locations by obtaining the additional impact parameters from the sensors and reporting the accurate positions and locations to the second computing device by the impact event reporting module. Thereafter at step 816, analyzing the accurate positions and locations of the objects/subjects by the emergency service provider to understand the extent of the impact. If the answer to step 808 is NO, the method redirects at step 806.

Referring to FIG. 9 is a flowchart 900 depicting an exemplary method for tracking the objects using the impact event monitoring device, in accordance with one or more exemplary embodiments. As an option, the exemplary method 500 is carried out in the context of the details of FIG. 1, FIG. 2, FIG. 3, FIG. 4, FIG. 5, FIG. 6A, FIG. 6B, FIG. 6C, FIG. 6D, FIG. 6E, FIG. 6F, FIG. 6G, FIG. 7, and FIG. 8. However, the exemplary method 900 is carried out in any desired environment. Further, the aforementioned definitions are equally applied to the description below.

The method commences at step 902, detecting the calibration of objects in rest position using the impact event monitoring device. Thereafter at step 904, reading the quaternions data, Euler angles, acceleration and gyroscope vectors, velocity and location (impact parameters) using the impact event monitoring device. Thereafter at step 906, tracking the live objects and measuring the statistics of the objects using the quaternions data obtained by the impact event monitoring device. Thereafter at step 908, displaying the graphs, charts of the statistics of the objects and the performance of the object son the display unit.

Referring to FIG. 10 is a flowchart 1000 depicting an exemplary method for displaying the activity recognition and performance grading of the objects, in accordance with one or more exemplary embodiments. As an option, the exemplary method 1000 is carried out in the context of the details of FIG. 1, FIG. 2, FIG. 3, FIG. 4, FIG. 5, FIG. 6A, FIG. 6B, FIG. 6C, FIG. 6D, FIG. 6E, FIG. 6F, FIG. 6G, FIG. 7, FIG. 8, and FIG. 9. However, the exemplary method 1000 is carried out in any desired environment. Further, the aforementioned definitions are equally applied to the description below.

The method commences at step 1002, detecting the calibration of objects in rest position using the impact event monitoring device. Thereafter at step 1004, reading the quaternions, Euler angles, acceleration and gyroscope vectors, velocity and location using the impact event monitoring device. Thereafter at step 1006, storing the impact parameters of the objects in the central database. Thereafter at step 1008, recognizing the pattern of the objects on the live impact parameters. Thereafter at step 1010, displaying the activity recognition and performance grading of the objects on the display unit.

Referring to FIG. 1100 is a flowchart 1100 depicting an exemplary method for displaying the movements of objects/subjects during the crash, in accordance with one or more exemplary embodiments. As an option, the exemplary method 1100 is carried out in the context of the details of FIG. 1, FIG. 2, FIG. 3, FIG. 4, FIG. 5, FIG. 6A, FIG. 6B, FIG. 6C, FIG. 6D, FIG. 6E, FIG. 6F, FIG. 6G, FIG. 7, FIG. 8, FIG. 9, and FIG. 10. However, the exemplary method 1100 is carried out in any desired environment. Further, the aforementioned definitions are equally applied to the description below.

The method commences at step 1102, detecting the calibration of objects/subjects in rest position using the impact event monitoring device. Thereafter at step 1104, reading the quaternions data, Euler angles, acceleration and gyroscope vectors, velocity and location (impact parameters) of the objects/subjects using the impact event monitoring device. Thereafter at step 1106, storing the impact parameters of the objects/subjects in the central database. Determining whether any anomalies or crash interrupts are detected from the accelerometer data using the impact event monitoring device, at step 1108. If the answer to step 1108 is YES, the method continues at step 1110, recording the head positions for a predetermined time (Fox example, 5 seconds) after crash interrupt. Thereafter at step 1112, displaying the movements of objects/subjects on the display unit during the crash. If the answer at step 1108 is NO, the method redirects at step 1104.

Referring to FIG. 12 is a flowchart 1200 depicting an exemplary method for detecting the location and direction of the impact after experiencing individual, in accordance with one or more exemplary embodiments. As an option, the exemplary method 1200 is carried out in the context of the details of FIG. 1, FIG. 2, FIG. 3, FIG. 4, FIG. 5, FIG. 6A, FIG. 6B, FIG. 6C, FIG. 6D, FIG. 6E, FIG. 6F, FIG. 6G, FIG. 7, FIG. 8, FIG. 9, FIG. 10, and FIG. 11. However, the exemplary method 1200 is carried out in any desired environment. Further, the aforementioned definitions are equally applied to the description below.

The method commences at step 1202, calibrating the first set of sensors, the second set of sensors, and the third set of sensors in the helmet. Determining whether the impact event is detected at a predetermined threshold value(for example, >10 g)?, at step 1204. If the answer at step 1204 is Yes, the method continues at step 1206, collecting linear acceleration and angular acceleration at each point of impact event using the first set of sensors, the second set of sensors, and the third set of sensors. Thereafter at step 1208, converting linear and angular acceleration data points into a function of time. Thereafter at step 1210, converting angular acceleration data points into a function of time. Thereafter at step 1212, acceleration function to pints of linear impact on the helmet. Thereafter at step 1214, mapping linear acceleration function to points of linear impact on the helmet. Thereafter at step 1216, detecting an impact force vector from linear and angular points of impact. Thereafter at step 1218, the analyzing accurate impact force vector for detecting the location and direction of the impact. If the answer at step 1204 is No, the method continues at step 1202.

Referring to FIG. 13 is a flowchart 1300 depicting an exemplary method for detecting the location and direction of the impact after experiencing the individual, in accordance with one or more exemplary embodiments. As an option, the exemplary method 1300 is carried out in the context of the details of FIG. 1, FIG. 2, FIG. 3, FIG. 4, FIG. 5, FIG. 6A, FIG. 6B, FIG. 6C, FIG. 6D, FIG. 6E, FIG. 6F, FIG. 6G, FIG. 7, FIG. 8, FIG. 9, FIG. 10, FIG. 11, and FIG. 12. However, the exemplary method 1300 is carried out in any desired environment. Further, the aforementioned definitions are equally applied to the description below.

Figure 14:
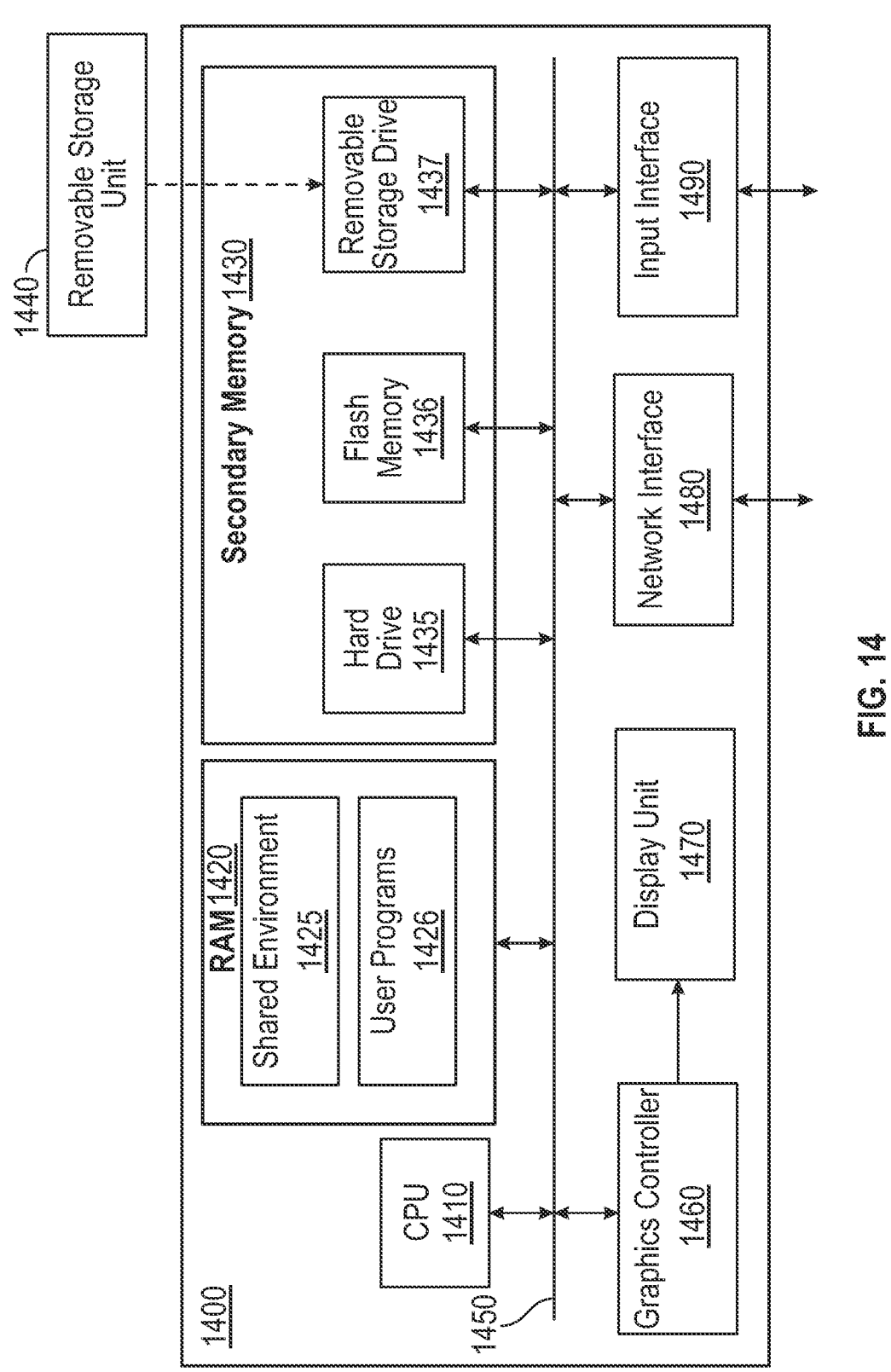
FIG. 14 is a block diagram illustrating the details of a digital processing system in which various aspects of the present disclosure are operative by execution of appropriate software instructions.

The method commences at step 1302, measuring the impact parameters by the impact event monitoring device through the sensors. Thereafter at step 1304, transmitting the measured impact parameters to the processing device by the sensors. Thereafter at step 1306, receiving and analyzing the measure impact parameters of the impact events by the processing device. Thereafter at step 1308, creating the impact data and identifying direction, location of the impact events by the processing device. Thereafter at step 1310, transmitting the impact data of the impact events to the second computing device by the processing device over the network. Thereafter at step 1312, receiving the impact data and the identified direction, the identified location of the impact events by the impact event reporting module on the second computing device. Thereafter at step 1314, enabling the emergency service provider to determine the severity of the impact events on the second computing device to provide better treatment to the individual Referring to FIG. 14 is a block diagram 1400 illustrating the details of a digital processing system 1400 in which various aspects of the present disclosure are operative by execution of appropriate software instructions. The Digital processing system 1400 may correspond to the computing devices 106, 108 (or any other system in which the various features disclosed above can be implemented).

Digital processing system 1400 may contain one or more processors such as a central processing unit (CPU) 1410, random access memory (RAM) 1420, secondary memory 1430, graphics controller 1460, display unit 1470, network interface 1480, and input interface 1490. All the components except display unit 1470 may communicate with each other over communication path 1450, which may contain several buses as is well known in the relevant arts. The components of FIG. 14 are described below in further detail.

CPU 1410 may execute instructions stored in RAM 1420 to provide several features of the present disclosure. CPU 1410 may contain multiple processing units, with each processing unit potentially being designed for a specific task. Alternatively, CPU 1410 may contain only a single general-purpose processing unit.

RAM 1420 may receive instructions from secondary memory 1430 using communication path 1450. RAM 1420 is shown currently containing software instructions, such as those used in threads and stacks, constituting shared environment 1425 and/or user programs 1426. Shared environment 1425 includes operating systems, device drivers, virtual machines, etc., which provide a (common) run time environment for execution of user programs 1426.

Graphics controller 1460 generates display signals (e.g., in RGB format) to display unit 1470 based on data/instructions received from CPU 1410. Display unit 1470 contains a display screen to display the images defined by the display signals. Input interface 1490 may correspond to a keyboard and a pointing device (e.g., touch-pad, mouse) and may be used to provide inputs. Network interface 1480 provides connectivity to a network (e.g., using Internet Protocol), and may be used to communicate with other systems (such as those shown in FIG. 1) connected to the network 110.

Secondary memory 1430 may contain hard drive 1435, flash memory 1436, and removable storage drive 1437. Secondary memory 1430 may store the data software instructions (e.g., for performing the actions noted above with respect to the Figures), which enable digital processing system 1400 to provide several features in accordance with the present disclosure.

Some or all of the data and instructions may be provided on removable storage unit 1440, and the data and instructions may be read and provided by removable storage drive 1437 to CPU 1410. Floppy drive, magnetic tape drive, CD-ROM drive, DVD Drive, Flash memory, removable memory chip (PCMCIA Card, EEPROM) are examples of such removable storage drive 1437.

Removable storage unit 1440 may be implemented using medium and storage format compatible with removable storage drive 1437 such that removable storage drive 1437 can read the data and instructions. Thus, removable storage unit 1440 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 1440 or hard disk installed in hard drive 1435. These computer program products are means for providing software to digital processing system 1400. CPU 1410 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 1430. Volatile media includes dynamic memory, such as RAM 1420. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus (communication path) 1450. Transmission media can also take the form of acoustic or light waves, such as those generated during radio-wave and infra-red data communications.

In some embodiments, a system 100 for identifying location and direction of impact events in real-time. The system 100 includes an impact event monitoring device 102. The impact event monitoring device 102 includes multiple sensors 204a, 204b, 204c, 206a, 206b, 206c, 208a, 208b, 208c a processing device 103, and a memory unit 220, whereby the sensors 204a, 204b, 204c, 206a, 206b, 206c, 208a, 208b, 208c and the memory unit 220 are electrically coupled to the processing device 103.

In some embodiments, the one or more sensors 204*a*, 204*b*, 204*c*, 206*a*, 206*b*, 206*c*, 208*a*, 208*b*, 208*c* configured to measure one or more impact parameters, wherein the one or more impact parameters comprise quaternions, Euler angles, vital statistics, rotational angle of the head of the individual and the object, motion of the individual and the object, gyroscope vectors, and velocity.

In some embodiments, measured impact parameters are transmitted to the processing device 103. The processing device 103 configured to analyze the measured impact parameters to create impact data and identify direction, location of one or more impact events of one or more impact events. The impact data includes a linear acceleration, an angular acceleration of the one or more impact events.

In some embodiments, a second computing device 108 includes an impact event reporting module. The impact event reporting module 114 configured to receive the impact data and identify direction, location of the impact events from the processing device 103 thereby enabling an emergency service provider to determine the severity of the one or more impact events to provide better treatment to the individual.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

Although the present disclosure has been described in terms of certain preferred embodiments and illustrations thereof, other embodiments and modifications to preferred embodiments may be possible that are within the principles of the invention. The above descriptions and figures are therefore to be regarded as illustrative and not restrictive.

Thus the scope of the present disclosure is defined by the appended claims and includes both combinations and sub-combinations of the various features described hereinabove as well as variations and modifications thereof, which would occur to persons skilled in the art upon reading the foregoing description.

What is claimed is:

1. A system for identifying location and direction of impact events in real-time, comprising:
   an impact event monitoring device comprising one or more sensors, a processing device, and a memory unit,
   wherein the one or more sensors and the memory unit are electrically coupled to the processing device;
   wherein the one or more sensors are configured to measure impact parameters,
   wherein the impact parameters comprise quaternions, Euler angles, vital statistics, rotational angle of a head of an individual and an object, motion of an individual and an object, gyroscope vectors, and velocity;
   wherein the measured impact parameters are transmitted to the processing device, wherein the processing device is configured to analyze the measured impact parameters to create impact data and identify direction and location of one or more impact events,
   wherein the impact data comprises a linear acceleration and an angular acceleration; and
   a computing device comprising an impact event reporting module,
   wherein the impact event reporting module is configured to receive the impact data and an identified direction and location of the one or more impact events from the processing device thereby enabling an emergency service provider to determine a severity of the one or more impact events to provide a treatment to the individual.

2. The system of claim 1, wherein the memory unit is configured to store the impact data, and the identified direction and location of the one or more impact events prior to transmission to the computing device.

3. The system of claim 1, further comprising a central database that is configured to store the impact parameters, the impact data, the identified direction and location of the one or more impact events.

4. The system of claim 1, wherein the impact event reporting module comprises an impact analyzing module configured to analyze the impact data received from the processing device and to identify a direction and location of one or more impact events.

5. The system of claim 1, wherein the impact event reporting module comprises an image capturing module configured to receive and process image or video data captured by an image capturing unit of the impact event monitoring device after the one or more impact events.

6. The system of claim 1, wherein the impact event reporting module comprises a position detection module configured to retrieve head and body position data of the individual, received from the impact event monitoring device, for a period of time before and after the one or more impact events.

7. The system of claim 1, wherein the impact event reporting module comprises a location detection module configured to retrieve and present geographical location data of the one or more objects and the individual, received from the impact event monitoring device, for a period of time before and after the one or more impact events.

8. The system of claim 1, wherein the impact event reporting module comprises an image processing module configured to convert position data corresponding to a predetermined time period before and after the one or more impact events into a short animation or video of positions of the one or more objects and the individual at a time of the one or more impact events.

9. The system of claim 1, wherein the impact event reporting module comprises an alert generating module configured to deliver the impact data and the identified direction and location of the one or more impact events as real-time notifications to the computing device.

10. The system of claim 4, wherein the impact analyzing module comprises a linear acceleration collecting module configured to collect linear acceleration data over a duration of the one or more impact events.

11. The system of claim 4, wherein the impact analyzing module comprises an angular acceleration collecting module configured to collect angular acceleration data over a duration of the one or more impact events.

12. The system of claim 4, wherein the impact analyzing module comprises a linear acceleration collecting module configured to collect linear acceleration data over a duration of the one or more impact events, an angular acceleration collecting module configured to collect angular acceleration data over the duration of the one or more impact events, and an impact direction detecting module configured to construct an object force as a function of time during the one or more impact events using the linear acceleration data and angular acceleration data collected by the linear acceleration collecting module and the angular acceleration collecting module.

13. The system of claim 1, wherein the impact event monitoring device comprises a motion detecting unit configured to measure changes in one or more orientations for continuous replication of movement and motion of one or more objects and the individual.

14. The system of claim 1, wherein the impact event monitoring device comprises a GPS module configured to detect a location at a time of the one or more impact events for the one or more objects and the individual.

15. The system of claim 1, wherein the impact event monitoring device comprises an image capturing unit configured to record video and capture images of the one or more objects and the individual.

16. The system of claim 1, wherein the impact event monitoring device comprises a network module configured to connect the impact event monitoring device with the computing device, wherein the network module is configured to send the impact data and the identified direction and location of one or more impact events as impact notifications to another computing device.

17. The system of claim 1, wherein the one or more sensors comprise one or more gyroscopes, one or more accelerometers, one or more compasses, one or more pressure sensors, one or more motion sensors, and one or more magnetometers.

18. A method for identifying location and direction of one or more impact events in real-time, comprising:

measuring impact parameters by one or more sensors;

wherein the impact parameters comprise quaternions, Euler angles, vital statistics, rotational angle of a head of an individual and an object, motion of the individual and the object, gyroscope vectors, and velocity;

transmitting the measured impact parameters to a processing device by the one or more sensors;

receiving and analyzing the impact parameters of the one or more impact events by the processing device;

creating impact data, and identifying direction and location of one or more impact events by the processing device;

transmitting the created impact data, and an identified direction and location of one or more impact events to a computing device by the processing device;

receiving the impact data, and the identified direction and location of the one or more impact events by an impact event reporting module on the computing device; and enabling an emergency service provider to determine a severity of the one or more impact events on the computing device to provide treatment to the individual.

19. The method of claim 18, wherein the impact data comprises a linear acceleration and an angular acceleration of the one or more impact events.

* * * * *